United States Patent
Yang et al.

(10) Patent No.: US 9,591,660 B2
(45) Date of Patent: Mar. 7, 2017

(54) COMMUNICATION METHOD TAKING CARRIER TYPE INTO CONSIDERATION, AND APPARATUS THEREFOR

(71) Applicant: LG ELECTRONICS INC., Seoul (KR)

(72) Inventors: Suckchel Yang, Anyang-si (KR); Joonkui Ahn, Anyang-si (KR); Yunjung Yi, Anyang-si (KR); Hanbyul Seo, Anyang-si (KR); Bonghoe Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 59 days.

(21) Appl. No.: 14/390,264

(22) PCT Filed: Apr. 3, 2013

(86) PCT No.: PCT/KR2013/002784
§ 371 (c)(1),
(2) Date: Oct. 2, 2014

(87) PCT Pub. No.: WO2013/151339
PCT Pub. Date: Oct. 10, 2013

(65) Prior Publication Data
US 2016/0044706 A1    Feb. 11, 2016

Related U.S. Application Data

(60) Provisional application No. 61/619,436, filed on Apr. 3, 2012, provisional application No. 61/622,019, filed
(Continued)

(51) Int. Cl.
H04W 72/12    (2009.01)
H04L 27/26    (2006.01)
(Continued)

(52) U.S. Cl.
CPC ......... H04W 72/1268 (2013.01); H04L 5/005 (2013.01); H04L 5/0007 (2013.01);
(Continued)

(58) Field of Classification Search
None
See application file for complete search history.

(56) References Cited

U.S. PATENT DOCUMENTS

2009/0279460 A1*  11/2009  Sarkar ................ H04L 1/16
                                              370/280
2012/0134316 A1    5/2012  Seo et al.
(Continued)

FOREIGN PATENT DOCUMENTS

KR    10-2011-0088382 A    8/2011
KR    10-2011-0118619 A    10/2011

OTHER PUBLICATIONS

Apple Inc., "On the Configuration and Usage of New Carrier Types," 3GPP TSG RAN WG1 Meeting #68, Feb. 6-10, 2012, pp. 1-6, R1-120271.
(Continued)

Primary Examiner — Hassan Kizou
Assistant Examiner — Ashil Farahmand
(74) Attorney, Agent, or Firm — Birch, Stewart, Kolasch & Birch, LLP

(57) ABSTRACT

The present invention relates to a wireless communication system. More particularly, the present invention relates to a method and apparatus for a terminal to receive a downlink signal in a wireless communication system. The method includes the steps of: receiving a downlink signal through a downlink period in a subframe including the downlink period, a gap period, and an uplink period; and demodulating the downlink signal, wherein the length of the downlink period is less than or equal to half of the subframe. When the
(Continued)

downlink signal is received on a first type of carrier, the downlink signal is demodulated using a first cell-common reference signal. When the downlink signal is received on a second type of carrier, the downlink signal is demodulated using a terminal-specific reference signal.

12 Claims, 14 Drawing Sheets

Related U.S. Application Data on Apr. 10, 2012, provisional application No. 61/648,612, filed on May 18, 2012, provisional application No. 61/751,233, filed on Jan. 10, 2013.

(51) Int. Cl.
  *H04W 72/04* (2009.01)
  *H04L 5/00* (2006.01)
(52) U.S. Cl.
  CPC ...... *H04L 27/2602* (2013.01); *H04L 27/2607* (2013.01); *H04W 72/0446* (2013.01); *H04L 5/001* (2013.01); *H04L 5/0023* (2013.01); *H04L 5/0051* (2013.01); *H04L 5/0082* (2013.01)

(56) References Cited

U.S. PATENT DOCUMENTS

| | | |
|---|---|---|
| 2012/0320845 A1 | 12/2012 | Choi et al. |
| 2013/0003673 A1* | 1/2013 | Dinan ............... H04W 72/0406 370/329 |
| 2013/0250879 A1* | 9/2013 | Ng ..................... H04W 72/042 370/329 |

OTHER PUBLICATIONS

Qualcomm Incorporated, "Acquisition, time and frequency tracking for the new carrier type," 3GPP TSG RAN WG1 #68, Feb. 6-10, 2012, pp. 1-3, R1-120536.

Renesas Mobile Europe Ltd, "On Transmission Mode for LTE Rel-11 New Carrier Type," 3GPP TSG RAN WG1 Meeting #68bis, Mar. 26-30, 2012, 2 pages, R1-121384.

* cited by examiner

COMMUNICATION METHOD TAKING CARRIER TYPE INTO CONSIDERATION, AND APPARATUS THEREFOR

CROSS REFERENCE TO RELATED APPLICATIONS

This application is the National Phase of PCT International Application No. PCT/KR2013/002784, filed on Apr. 3, 2013, which claims priority under 35 U.S.C. 119(e) to U.S. Provisional Application No. 61/619,436, filed on Apr. 3, 2012, 61/622,019 filed on Apr. 10, 2012, 61/648,612 filed on May 18, 2012 and 61/751,233 filed on Jan. 10, 2013, all of which are hereby expressly incorporated by reference into the present application.

TECHNICAL FIELD

The present invention relates to a communication method and an apparatus for the same when a plurality of carrier types is used in a wireless communication system. More specifically, the present invention relates to a method of transmitting/receiving signals in consideration of carrier type, a signaling method, a method of configuring a subframe and an apparatus therefor. The wireless communication system includes a system supporting carrier aggregation (CA).

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA). In a wireless communication system, a user equipment (UE) can receive information from an eNB on downlink (DL) and transmit information to the eNB on uplink (UL). Information transmitted or received by the UE includes data and various types of control information and there are various physical channels according to types and purposes of information transmitted or received by the UE.

DISCLOSURE

Technical Problem

An object of the present invention devised to solve the problem lies in a method for efficiently performing communication and an apparatus therefor when a plurality of carrier types is used in a wireless communication system. Another object of the present invention is to provide a method for efficiently transmitting/receiving signals in consideration of carrier type, a signaling method, a method of configuring a subframe and an apparatus therefor.

The technical problems solved by the present invention are not limited to the above technical problems and those skilled in the art may understand other technical problems from the following description.

Technical Solution

The object of the present invention can be achieved by providing a method for receiving a downlink signal by a UE supporting a plurality of carrier types in a wireless communication system, the method including: receiving a first downlink signal through a downlink period in a subframe including the downlink period, a gap period, and an uplink period; and demodulating the first downlink signal, wherein a length of the downlink period is less than or equal to half the subframe, the first downlink signal is demodulated using a first cell-common reference signal when the first downlink signal is received on a first type carrier, and the first downlink signal is demodulated using a UE-specific reference signal when the first downlink signal is received on a second type carrier.

In another aspect of the present invention, provided herein is a UE used in a wireless communication system, including: a radio frequency (RF) unit; and a processor, wherein the processor is configured to receive a first downlink signal through a downlink period in a subframe including the downlink period, a gap period, and an uplink period and to demodulate the first downlink signal, wherein a length of the downlink period is less than or equal to half the subframe, the first downlink signal is demodulated using a first cell-common reference signal when the first downlink signal is received on a first type carrier, and the first downlink signal is demodulated using a UE-specific reference signal when the first downlink signal is received on a second type carrier.

The first type carrier may be a carrier through which the first cell-common reference signal is received in all subframes and the second type carrier may be a carrier through which a second cell-common reference signal is received only in some subframes.

The subframe may include 14 OFDM (Orthogonal Frequency Division Multiplexing) symbols and the length of the downlink period may correspond to 3 OFDM symbols when a normal CP (cyclic prefix) is set.

The subframe may include 12 OFDM symbols and the length of the downlink period may correspond to 3 OFDM symbols when an extended CP is set.

The first downlink signal may be a PDSCH (Physical Downlink Shared Channel) signal, wherein a PDCCH (Physical Downlink Control Channel) signal corresponding to the PDSCH signal is received on the first type carrier when the PDSCH signal is received on the first type carrier, and the PDCCH signal corresponding to the PDSCH signal is received on a carrier different from the second type carrier when the PDSCH signal is received on the second type carrier.

The first downlink signal may include an uplink grant control channel signal for scheduling an uplink data channel signal.

Advantageous Effects

According to the present invention, it is possible to efficiently perform communication when a plurality of carrier types is used in a wireless communication system. In addition, it is possible to efficiently transmit/receive signals in consideration of carrier type, perform signaling and configure a type.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3$^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is evolved from 3GPP LTE.

While the following description is given, centering on 3GPP for clarity, this is purely exemplary and thus should not be construed as limiting the present invention.

The present invention is described based on LTE-A. The concept or proposed schemes and embodiments of the present invention are applicable to other systems (e.g. IEEE 802.16m) using multiple carriers without restriction.

Figure 1:
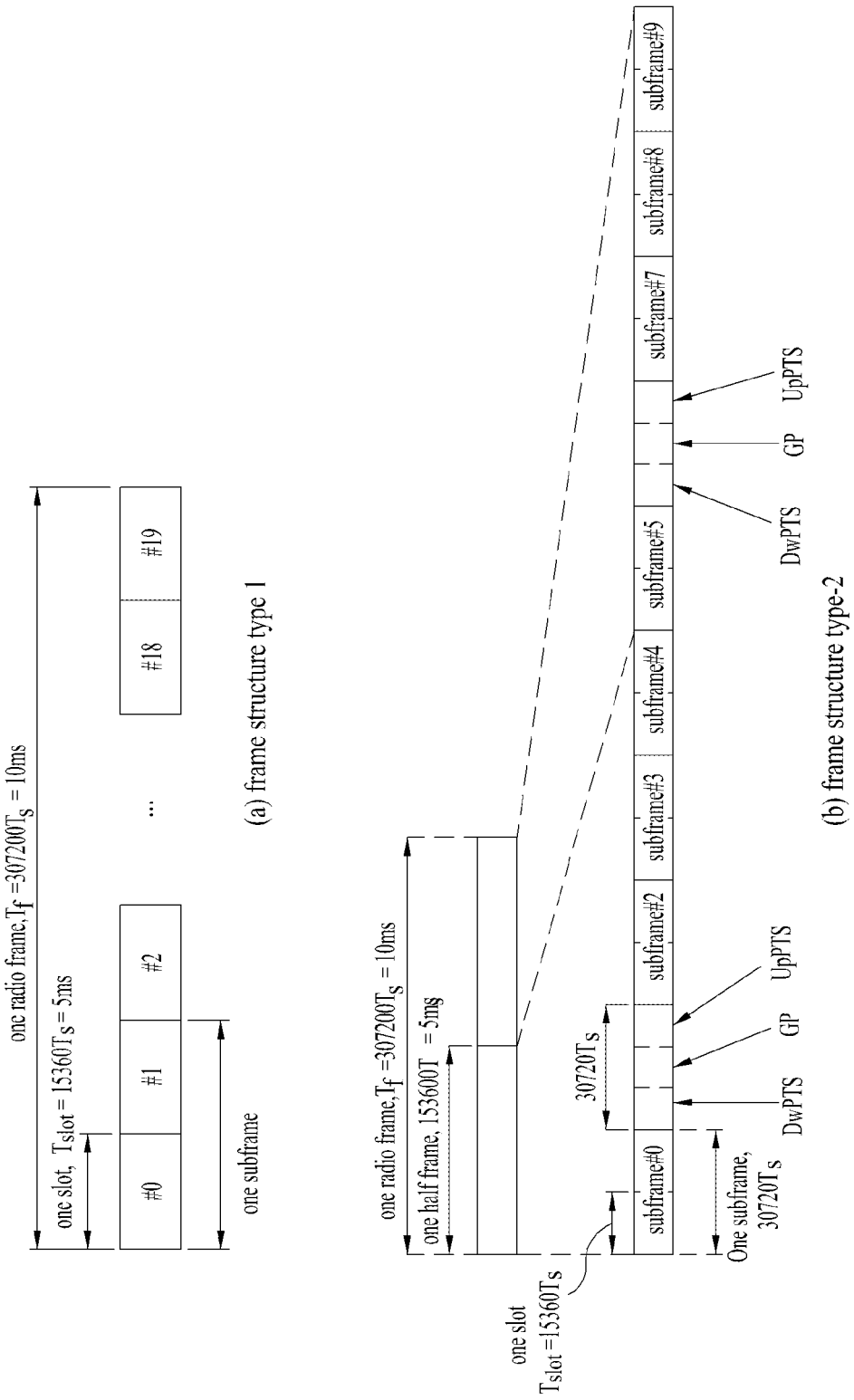
FIG. 1 illustrates a radio frame structure used in LTE-(A)

FIG. 1 illustrates a radio frame structure used in LTE(-A). Uplink/downlink data packet transmission is performed on a subframe-by-subframe basis and a subframe is defined as a predetermined time interval including a plurality of symbols. 3GPP LTE supports a type-1 radio frame structure applicable to FDD (Frequency Division Duplex) and a type-2 radio frame structure applicable to TDD (Time Division Duplex).

FIG. 1(a) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on Cyclic Prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 1(b) illustrates a type-2 radio frame structure. The type-2 radio frame includes 2 half frames. Each half frame includes 4(5) normal subframes and 1(0) special subframe. A normal subframe is used on uplink or downlink according to uplink-downlink (UL-DL) configuration. A subframe includes 2 slots.

Table 1 shows UL-DL configurations of subframes in a radio frame.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (downlink pilot timeslot), GP (guard period), and UpPTS (uplink pilot timeslot). DwPTS is used for initial cell search, synchronization or channel estimation of a UE. UpPTS is used for channel estimation of a BS and uplink transmission synchronization of a UE. The GP is a period for cancelling interference generated on uplink due to multi-path delay of a downlink signal between uplink and downlink.

Figure 2:
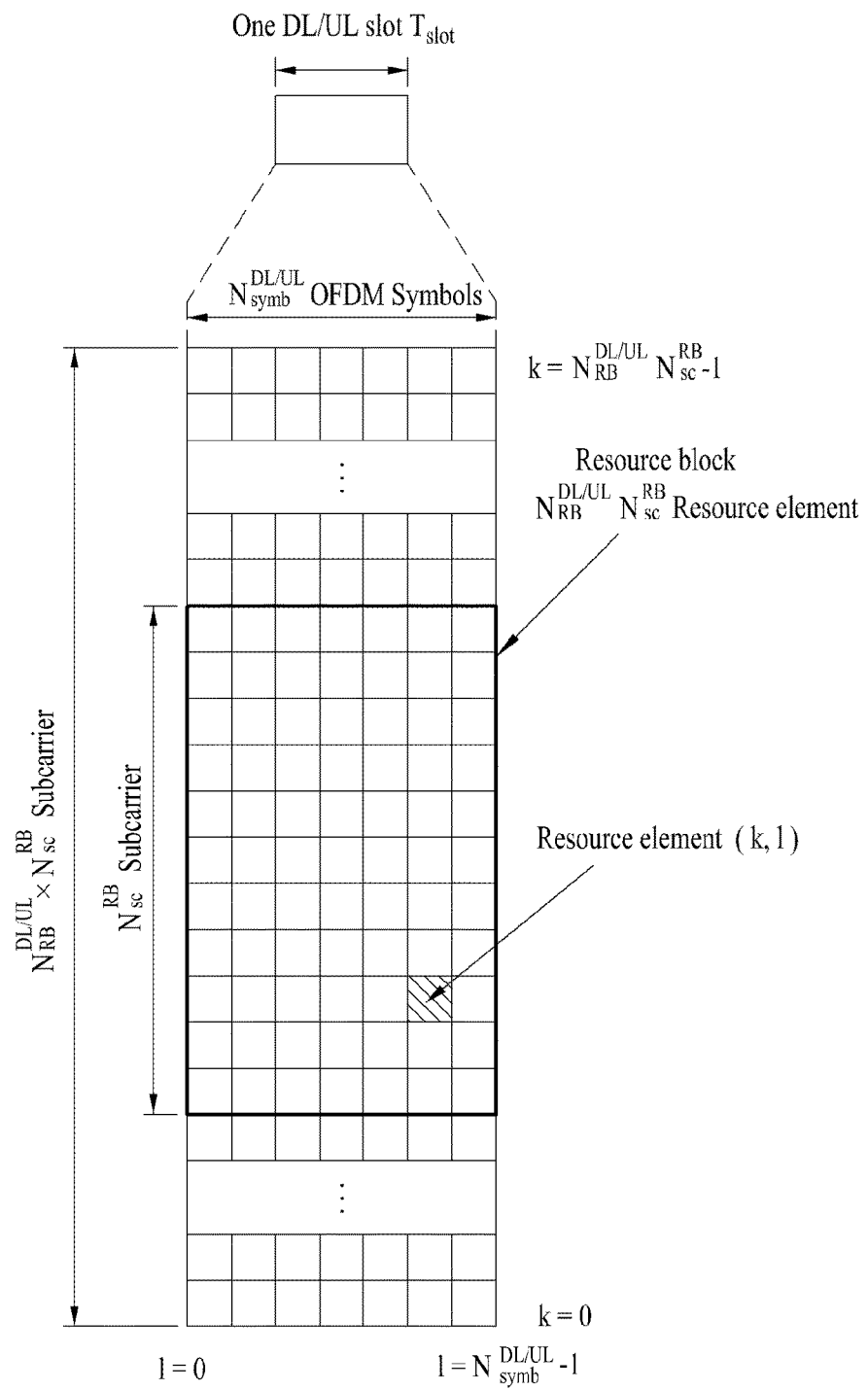
FIG. 2 illustrates a resource grid of a downlink slot.

FIG. 2 illustrates a resource grid of a downlink slot.

Referring to FIG. 2, a downlink slot includes a plurality of OFDM symbols in the time domain. One downlink slot may include 7(6) OFDM symbols and a plurality of resource blocks (RBs). One RB may include 12 subcarriers in the frequency domain. Each element on the resource grid is referred to as a resource element (RE). One RB includes 12×7(6) REs. The number $N^{DL}$ of RBs included in the downlink slot depends on a downlink transmit bandwidth. The structure of an uplink slot may be same as that of the downlink slot and OFDM symbols are replaced by SC-FDMA symbols in the structure.

Figure 3:
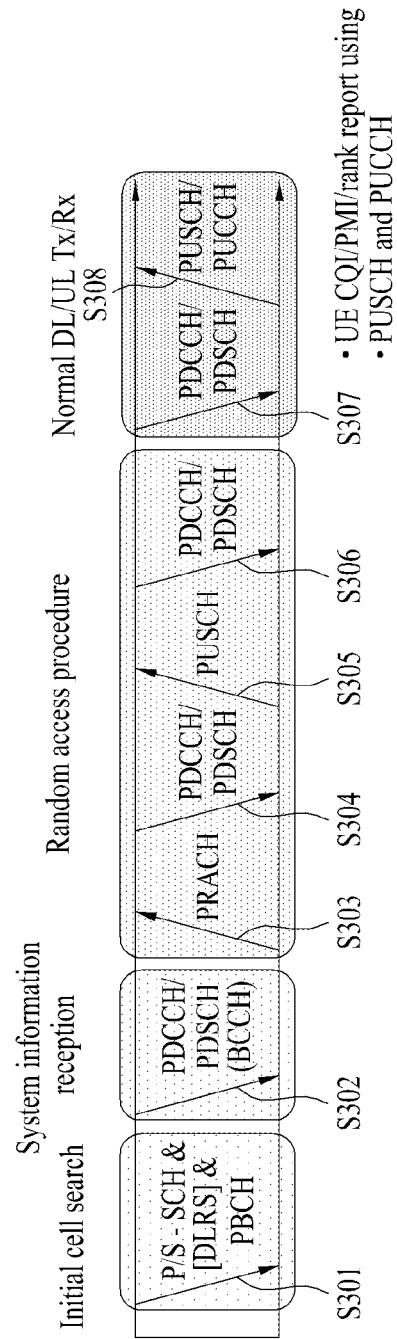
FIG. 3 illustrates physical channels used in LTE-(A) and a signal transmission method using the same.

FIG. 3 illustrates physical channels used in LTE(-A) and a signal transmission method using the same.

Referring to FIG. 3, when powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Here, control information transmitted from the UE to the BS is called uplink control information (UCI). The UCI may include a hybrid automatic repeat and request (HARQ) acknowledgement (ACK)/negative-ACK (HARQ ACK/NACK) signal, a scheduling request (SR), channel state information (CSI), etc. The CSI includes a channel quality indicator (CQI), a precoding matrix index (PMI), a rank indicator (RI), etc. While the UCI is transmitted through a PUCCH in general, it may be transmitted through a PUSCH when control information and traffic data need to be simultaneously transmitted. The UCI may be aperiodically transmitted through a PUSCH at the request/instruction of a network.

Figure 4:
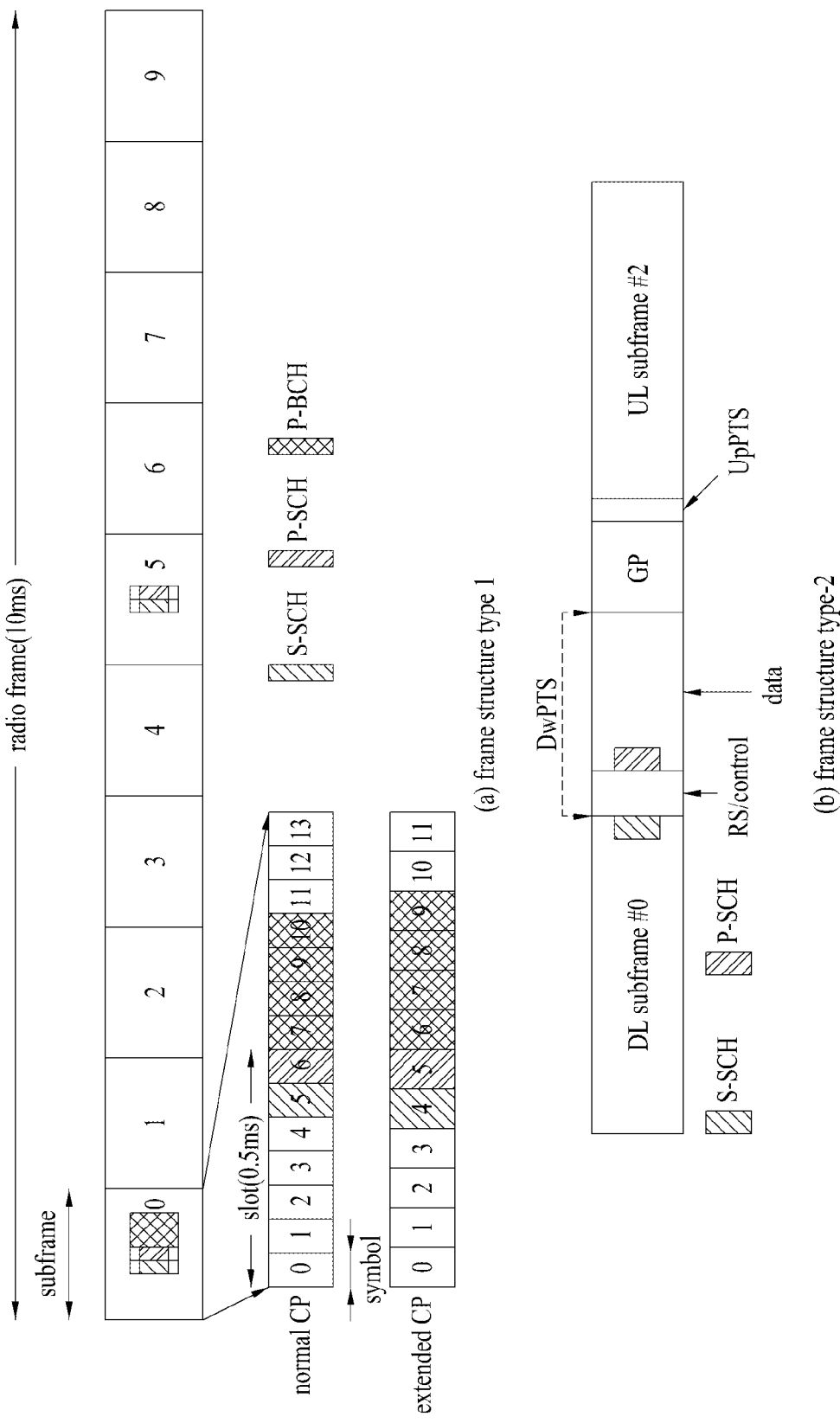
FIG. 4 illustrates synchronization channel and broadcast channel structures in a radio frame.

FIG. 4 illustrates a primary broadcast channel (P-BCH) and a synchronization channel (SCH). The SCH includes a P-SCH and an S-SCH. The P-SCH carries a primary synchronization signal (PSS) and the S-SCH carries a secondary synchronization signal (SSS).

Referring to FIG. 4, in frame configuration type-1 (FDD), the P-SCH is located in the last OFDM symbols of slot #0 (i.e. the first slot of subframe #0) and slot #10 (i.e. the first slot of subframe #5) in each radio frame. The S-SCH is located OFDM symbols immediately before the last OFDM symbols of slot #0 and Slot #10. The S-SCH and P-SCH are disposed in consecutive OFDM symbols. In frame configuration type-2 (TDD), the P-SCH is transmitted through the third OFDM symbol of subframe #1/#6 and the S-SCH is located in the last OFDM symbols of slot #1 (i.e. the second slot of subframe #0) and slot #11 (i.e. the second slot of subframe #5). The P-SCH is transmitted for every 4 radio frames irrespective of frame configuration type using the first to fourth OFDM symbols of the second slot of subframe #0. The P-SCH is transmitted using 72 subcarriers (10 subcarriers are reserved and 62 subcarriers are used for PSS transmission) on the basis of direct current (DC) subcarriers in OFDM symbols. The S-SCH is transmitted using 72 subcarriers (10 subcarriers are reserved and 62 subcarriers are used for SSS transmission) on the basis of DC subcarriers in OFDM symbols. The P-BCH is mapped to 72 subcarriers on the basis of 4 OFDM symbols and DC subcarriers in one subframe.

Figure 5:
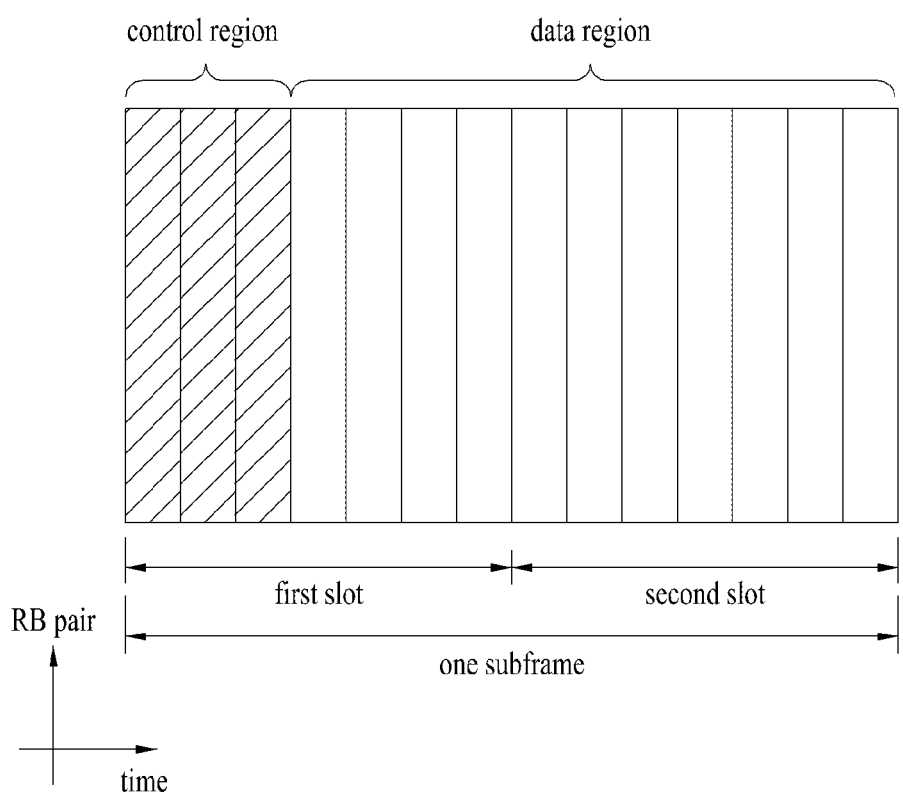
FIG. 5 illustrates a downlink subframe structure.

FIG. 5 illustrates a downlink subframe structure.

Referring to FIG. 5, a maximum of 3 (4) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc.

Figure 6:
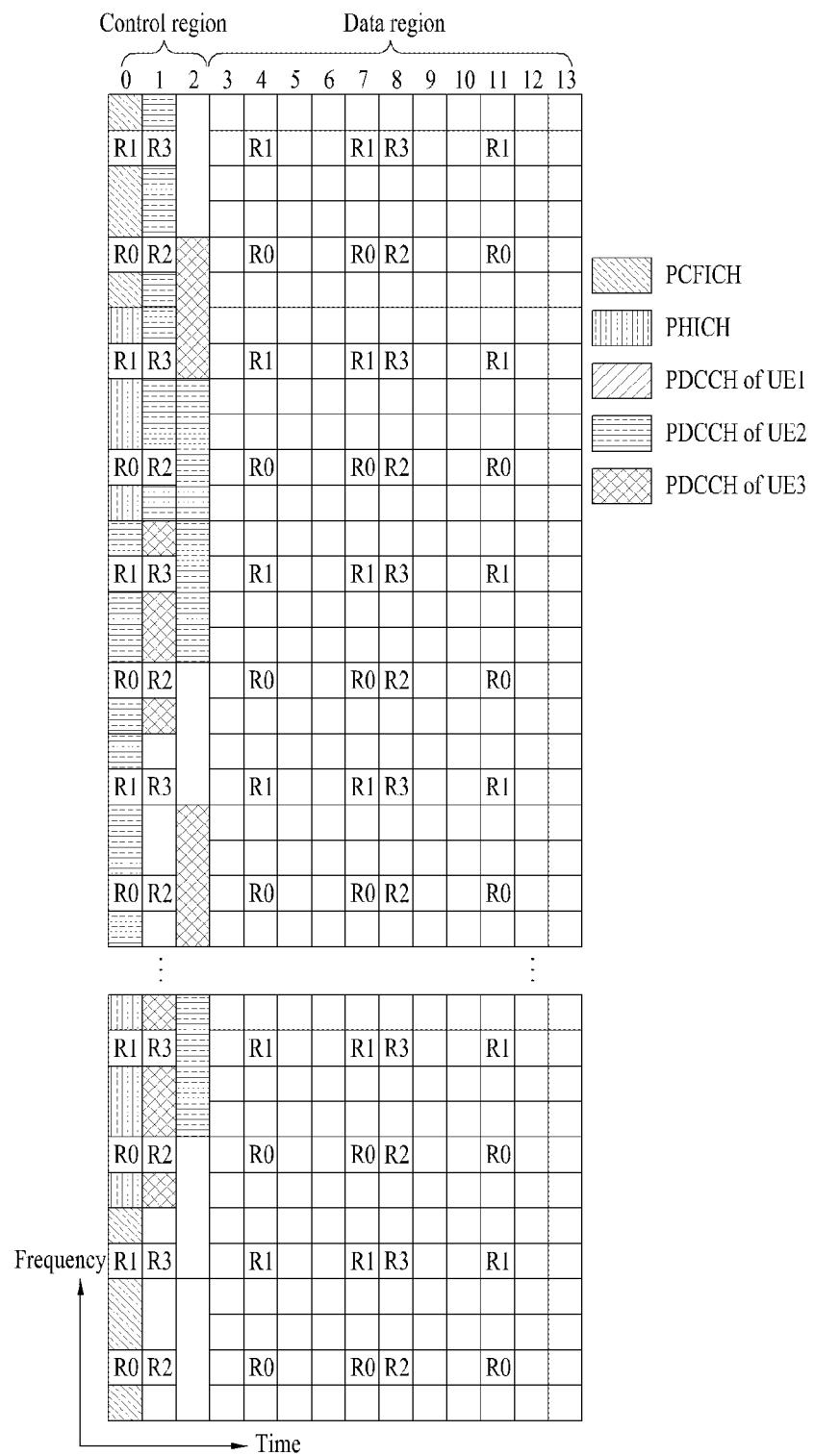
FIG. 6 illustrates a control channel and a CRS (Cell-specific Reference Signal or Cell-common Reference Signal) allocated to a downlink subframe.

FIG. 6 illustrates a control channel allocated to a downlink subframe. In FIG. 6, R1 to R4 represent CRSs (Cell-specific Reference Signals or Cell-common Reference Signals) for antenna ports 0 to 3. A CRS is transmitted per subframe in total-band and fixed to a specific pattern in a subframe. The CRS is used for channel measurement and downlink signal demodulation.

Referring to FIG. 6, a PCFICH is transmitted at a first OFDM symbol of a subframe and carries information regarding the number of OFDM symbols used for transmission of control channels within the subframe. The PCFICH is composed of 4 REGs which are equally distributed in the control region on the basis of cell ID. The PCFICH indicates values of 1 to 3 (or 2 to 4) and is modulated according to QPSK (Quadrature Phase Shift Keying). The PHICH is a response of uplink transmission and carries an HARQ acknowledgment (ACK)/negative-acknowledgment (NACK) signal. The PHICH is allocated to REGs except CRS and PCFICH (first OFDM symbol) in one or more OFDM symbols set based on PHICH duration. The PHICH is allocated to 3 REGs distributed in the frequency domain.

A PDCCH is allocated to first n OFDM symbols (referred to as a control region hereinafter) of a subframe. Here, n is an integer equal to or greater than 1 and is indicated by a PCFICH. Control information transmitted through a PDCCH is referred to as DCI. Formats 0, 3, 3A and 4 for uplink and formats 1, 1A, 1B, 1C, 1D, 2, 2A, 2B and 2C for downlink are defined as DCI formats. Information field types, the number of information fields and the number of bits of each information field depend on DCI format. For example, the DCI formats selectively include information such as hopping flag, RB allocation, MCS (modulation coding scheme), RV (redundancy version), NDI (new data indicator), TPC (transmit power control), HARQ process number, PMI (precoding matrix indicator) confirmation as necessary.

The PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

A plurality of PDCCHs can be transmitted in a subframe. Each PDCCH is transmitted using one or more CCEs each of which corresponds to 9 sets of 4 REs. 4 REs are referred to as a resource element group (REG). 4 QPSK symbols are mapped to an REG. An RE allocated to a reference signal is not included in an REG and thus the number of REGs in an OFDM symbol depends on presence or absence of a cell-specific reference signal.

Table 2 shows the number of CCEs, the number of REGs and the number of PDCCH bits according to PDCCH format.

TABLE 2

| PDCCH format | Number of CCEs (n) | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

CCEs are sequentially numbered. To simplify decoding, transmission of a PDCCH having a format composed of n CCEs can be started using a multiple of n CCEs. The number of CCEs used to transmit a specific PDCCH is determined by a BS according to channel quality. For example, in case of a PDCCH assigned to a UE having a high-quality downlink channel (e.g. a channel close to the BS), only one CCE can be used to transmit the PDCCH. However, in the case of a PDCCH assigned to a UE having a poor channel state (e.g. close to a cell edge), 8 CCEs can be used for PDCCH transmission in order to obtain sufficient robustness. In addition, a power level of the PDCCH can be controlled according to channel quality.

In LTE(-A), positions of CCEs in a limited set in which a PDCCH can be disposed for each UE are defined. The positions of CCEs in a limited set in which a UE can detect a PDCCH allocated thereto are referred to as the "search space (SS)". In LTE(-A), the size of the search space depends upon the PDCCH format. In addition, UE-specific and common search spaces are separately defined. The UE-specific search space (USS) is set on a UE basis, whereas the common search space (CSS) is known to all UEs. The USS and CSS may overlap. If a UE has a considerably small search space, no CCE is left when CCEs are allocated in the search space. Accordingly, a BS may not detect CCEs through which a PDCCH will be transmitted to the UE in a predetermined subframe, which is referred to as blocking. To minimize possibility that blocking continues in the next subframe, the start point of the USS is hopped in a UE-specific manner.

Sizes of the CSS and USS are shown in Table 3.

TABLE 3

| PDCCH Format | Number of CCEs (n) | Number of PDCCH candidates in CSS | Number of PDCCH candidates in USS |
| --- | --- | --- | --- |
| 0 | 1 | 9 | 72 |
| 1 | 2 | 18 | 144 |
| 2 | 4 | 36 | 288 |
| 3 | 8 | 72 | 576 |

To control computational load of blind decoding based on the number of blind decoding processes, a UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as formats 0 and 1A and may be discriminated from each other by scrambling CRC with different (common) identifiers rather than a UE-specific identifier. PDSCH transmission schemes according to transmission mode and information content of DCI formats are arranged in the following.

Transmission Mode

Transmission mode 1: Transmission from a single BS antenna port

Transmission mode 2: Transmit diversity

Transmission mode 3: Open-loop spatial multiplexing

Transmission mode 4: Closed-loop spatial multiplexing

Transmission mode 5: Multi-user MIMO

Transmission mode 6: Closed-loop rank-1 precoding

Transmission mode 7: Single-antenna port (port 5) transmission

Transmission mode 8: Double layer transmission (ports 7 and 8) or single-antenna port (port 7 or 8) transmission Transmission modes 9 and 10: Up to 8 layer transmission (ports 7 to 14) or single-antenna port (port 7 or 8) transmission.

DCI Format

Format 0: Resource grants for the PUSCH transmissions (uplink)

Format 1: Resource assignments for single codeword PDSCH transmissions (transmission modes 1, 2 and 7)

Format 1A: Compact signaling of resource assignments for single codeword PDSCH (all modes)

Format 1B: Compact resource assignments for PDSCH using rank-1 closed loop precoding (mode 6)

Format 1C: Very compact resource assignments for PDSCH (e.g. paging/broadcast system information)

Format 1D: Compact resource assignments for PDSCH using multi-user MIMO (mode 5)

Format 2: Resource assignments for PDSCH for closed-loop MIMO operation (mode 4)

Format 2A: Resource assignments for PDSCH for open-loop MIMO operation (mode 3)

Format 3/3A: Power control commands for PUCCH and PUSCH with 2-bit/1-bit power adjustments Format 4: Resource grants for PUSCH transmission (uplink) in a cell set to multi-antenna port transmission mode DCI formats can be classified into a TM-dedicated format and a TM-common format. The TM-dedicated format refers to a DCI format set to a corresponding TM only and the TM-common format refers to a DCI format set to all TMs. For example, DCI format 2B is a TM-dedicated DCI format in the case of TM 8, DCI format 2C is a TM-dedicated DCI format in the case of TM 9 and DCI format 2D is a TM-dedicated DCI format in the case of TM 10. DCI format 1A may be a TM-common DCI.

Figure 7:
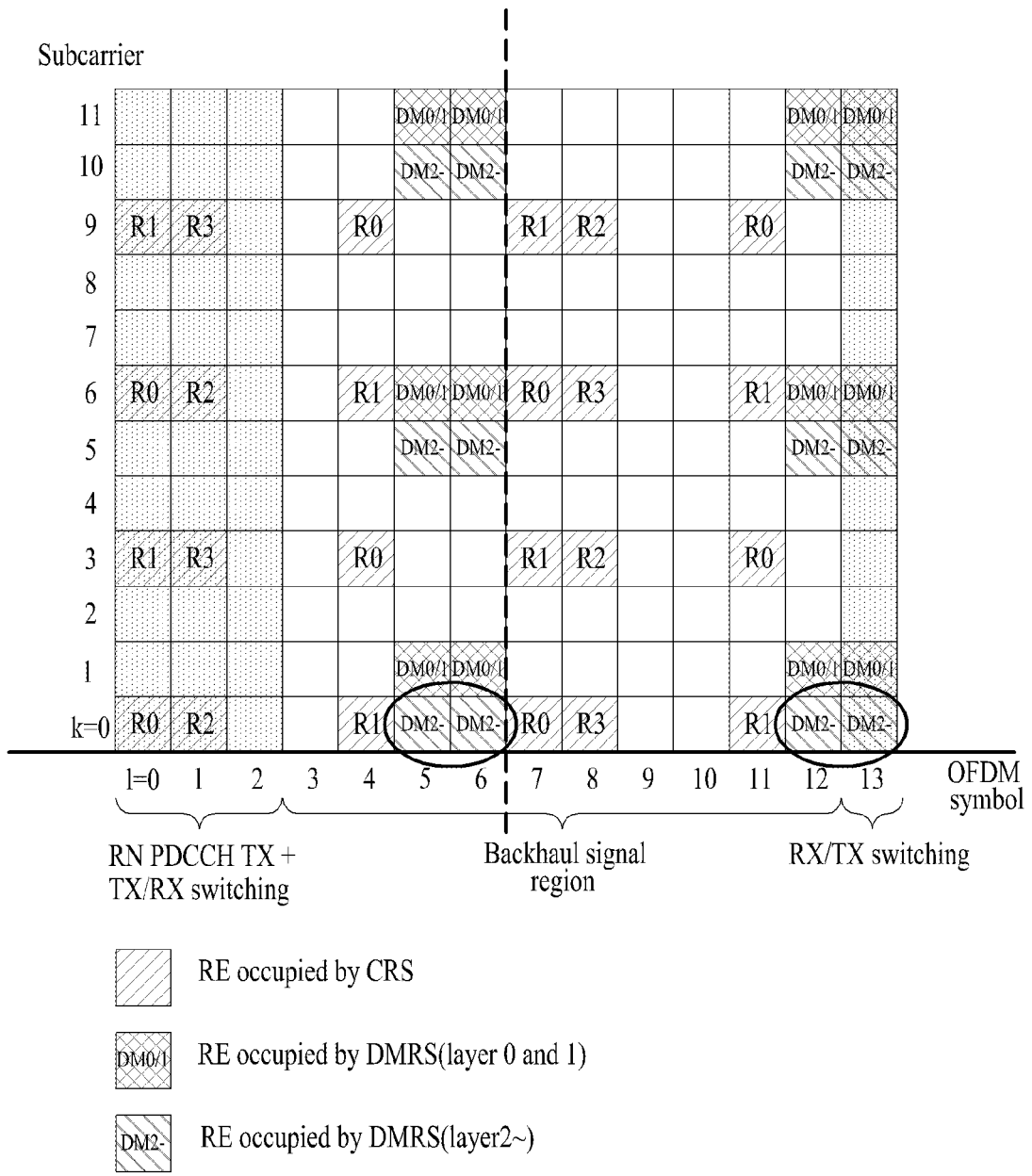
FIG. 7 illustrates a DM-RS (Demodulation Reference Signal) (or UE-specific RS) structure.

FIG. 7 illustrates a configuration of a demodulation reference signal (DM-RS) configuration added to LTE-A. A DM-RS is a UE-specific RS used to demodulate a signal of each layer when signals are transmitted using multiple antennas. Since LTE-A considers a maximum of 8 transmit antennas, a maximum of 8 layers and respective DM-RSs therefor are needed.

Referring to FIG. 7, two or more layers share the same RE and DM-RS is multiplexed according to CDM (Code Division Multiplexing). Specifically, DM-RSs for respective layers are spread using a spreading code (e.g. an orthogonal code such as a Walsh code or a DFT code) and then multiplexed to the same RE. For example, DM-RSs for layers 0 and 1 share the same RE and are spread on 2 REs of OFDM symbols 12 and 13 using an orthogonal code. That is, in each slot, the DM-RSs for layers 0 and 1 are spread using a code with SF (Spreading Factor)=2 in the time domain and then multiplexed to the same RE. For example, the DM-RS for layer 0 can be spread using [+1 +1] and the DM-RS for layer 1 can be spread using [+1 −1]. Similarly, DM-RSs for layers 2 and 3 are spread on the same REs using different orthogonal codes. DM-RSs for layers 4, 5, 6 and 7 are spread on REs occupied by DM-RSs 0, 1, 2 and 3 using a code orthogonal to layers 0, 1, 2 and 3. A code with SF=2 is used for DM-RS for up to 4 layers and a code with SF=4 is used for DM-RSs when five or more layers are used. Antenna ports for DM-RSs are {7, 8, . . . , n+6} (n being the number of layers).

Table 4 shows spreading sequences for antenna ports 7 to 14 defined in LTE-A.

TABLE 4

| Antenna port p | $[w_p(0)\ w_p(1)\ w_p(2)\ w_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

Referring to Table 4, orthogonal codes for antenna ports 7 to 10 have a structure in which a length-2 orthogonal code is repeated. Accordingly, a length-2 orthogonal code is used at the slot level for up to 4 layers and a length-4 orthogonal code is used at the subframe level when five or more layers are used.

Figure 8:
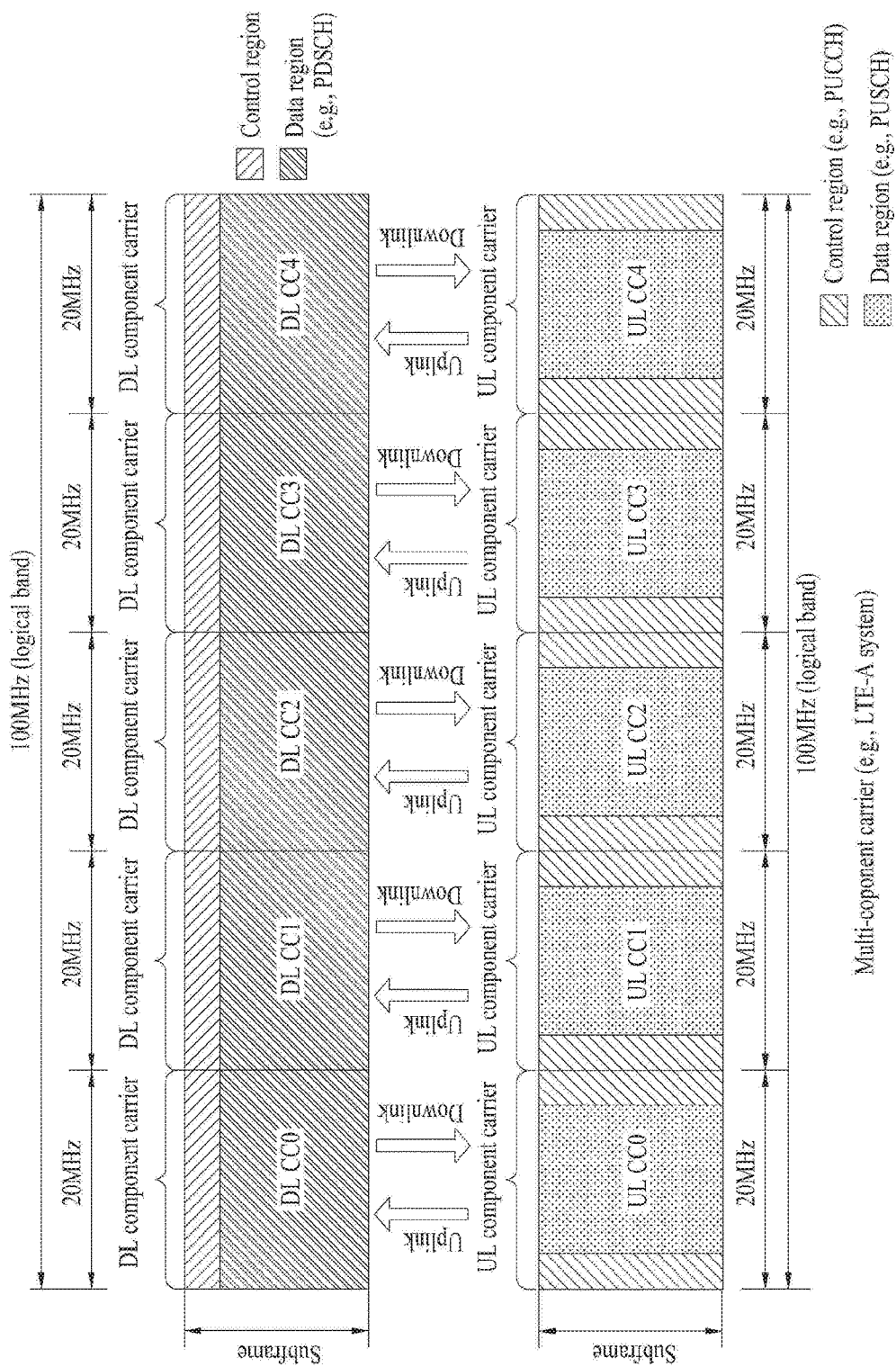
FIG. 8 illustrates a CA (carrier aggregation) communication system.

FIG. 8 illustrates a carrier aggregation (CA) communication system.

Referring to FIG. 8, a plurality of uplink/downlink component carriers (CCs) can be aggregated to support a wider uplink/downlink bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC can be referred to as a primary CC (PCC) and other CCs can be referred to as secondary CCs (SCCs). For example, when cross-carrier scheduling (or cross-CC scheduling) is applied, a PDCCH for downlink allocation can be transmitted through DL CC#0 and a PDSCH corresponding to the PDCCH can be transmitted through DL CC#2. The term "component carrier" can be replaced by other equivalent terms (e.g. carrier, cell, etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.

No CIF

CIF enabled: a PDCCH on a DL CC can be used to allocate a PDSCH or PUSCH resource on a specific DL/UL CC from among a plurality of aggregated DL/UL CCs using the CIF.

LTE DCI format extended to have the CIF

CIF corresponds to a fixed x-bit field (e.g. x=3) (when the CIF is set).

CIF position is fixed irrespective of DCI format size (when the CIF is set).

When the CIF is present, the BS can allocate a PDCCH monitoring DL CC (set) to reduce BD complexity of the UE. For PDSCH/PUSCH scheduling, a UE can detect/decode a PDCCH only in the corresponding DL CC. The BS can transmit the PDCCH only through the monitoring DL CC (set). The monitoring DL CC set can be set UE-specifically, UE-group-specifically or cell-specifically.

Figure 9:
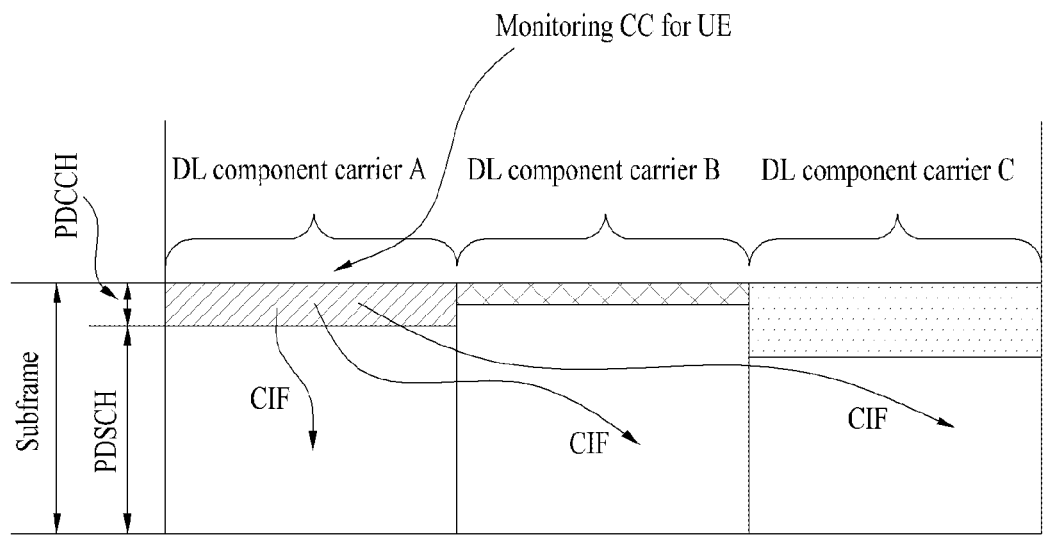
FIG. 9 illustrates cross-carrier scheduling.

FIG. 9 illustrates a case in which 3 DL CCs are aggregated and DL CC A is set to a monitoring DL CC. When the CIF is disabled, each DL CC can carry a PDCCH that schedules a PDSCH of the DL CC without the CIF according to LTE PDCCH rules. When the CIF is enabled through higher layer signaling, DL CC A can carry not only a PDSCH thereof but also PDSCHs of other DL CCs using the CIF. DL CC B and DL CC C which are not set to monitoring DL CCs do not carry a PDCCH. Here, the term "monitoring DL CC" can be used interchangeably with terms such as "monitoring carrier", "monitoring cell". "scheduling carrier", "scheduling cell", "serving carrier", "serving cell", etc. A DL CC on which a PDSCH corresponding to a PDCCH is transmitted and a UL CC on which a PUSCH corresponding to a PUCCH is transmitted are referred to as scheduled carriers, scheduled cells, etc.

In LTE(-A), an FDD DL carrier and TDD DL subframe use first n OFDM symbols of the subframe to transmit physical channels for control information transmission, such as a PDCCH, PHICH, PCFICH, etc. and use other OFDM symbols for PDSCH transmission. The number of symbols used for control channel transmission in each subframe is signaled to the UE dynamically through a physical channel such as a PCFICH or semi-statically through RRC signaling. The value n can be set to one to a maximum of four symbols according to subframe characteristics and system characteristics (FDD/TDD, system band, etc.). A PDCCH, a physical channel for DL/UL scheduling and control information, is transmitted through limited OFDM symbols in LTE. Accordingly, LTE(-A) introduces an enhanced PDCCH (E-PDCCH) that is freely multiplexed with a PDSCH according to FDM.

Figure 10:
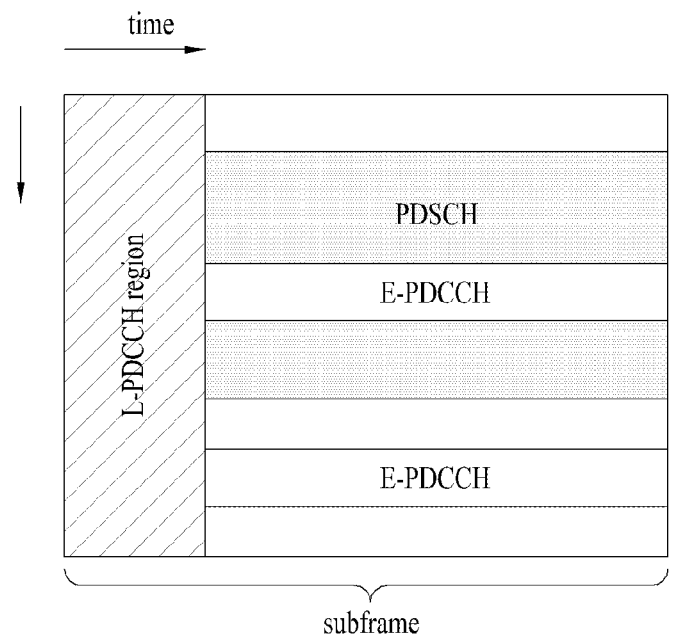
FIG. 10 illustrates an example of allocating a PDCCH to a data region of a subframe.

FIG. 10 illustrates an example of allocating a downlink physical channel to a subframe.

Referring to FIG. 10, a PDCCH (legacy PDCCH, L-PDCCH) according to LTE(-A) can be allocated to a control region (refer to FIGS. 6 and 7) of a subframe. In FIG. 10, an L-PDCCH region represents a region to which the legacy PDCCH can be assigned. The L-PDCCH region may refer to a control region, a control channel resource region (i.e. CCE resource) to which a PDCCH can be actually allocated in the control region or a PDCCH search space. A PDCCH can be additionally allocated to a data region (e.g. a resource region for a PDSCH) (refer to FIGS. 6 and 7). The PDCCH allocated to the data region is referred to as an E-PDCCH. As shown in FIG. 10, it is possible to mitigate scheduling restriction due to limited control channel resources of the L-PDCCH region by additionally securing control channel resources through the E-PDCCH.

Specifically, the E-PDCCH can be detected/demodulated based on a DM-RS. The E-PDCCH may be transmitted over PRB pairs in the time domain. More specifically, a search space (SS) for E-PDCCH detection may be composed of one or more (e.g. 2) E-PDCCH candidate sets. Each E-PDCCH candidate set may occupy a plurality of (e.g. 2, 4 or 8) PRB pairs. Enhanced-CCEs (E-CCEs) constituting an E-PDCCH set may be mapped in a localized or distributed manner (according to whether one E-CCE is distributed in a plurality of PRB pairs). When E-PDCCH based scheduling is set, a subframe in which E-PDCCH transmission/detection is performed may be designated. The E-PDCCH can be configured in a USS only. A UE may attempt DCI detection only for L-PDCCH CSS and E-PDCCH USS in a subframe (referred to as an E-PDCCH subframe) in which E-PDCCH transmission/detection is set and attempt DCI detection for L-PDCCH CSS and L-PDCCH USS in a subframe (non-E-PDCCH subframe) in which E-PDCCH transmission/detection is not set.

In the case of E-PDCCH, a USS may be composed of K E-PDCCH sets (per CC/cell) for one UE. K may be a number equal to or greater than 1 and equal to or small than a specific upper limit. Each E-PDCCH set may be composed of N PRBs (belonging to a PDSCH region). Here, N and PRB resources/indexes corresponding thereto may be set set-specifically (and UE-specifically). PUCCE resources/indexes respectively linked to E-CCE resources/indexes may be allocated set-specifically (and UE-specifically) by setting a start PUCCH resource/index per E-PDCCH set. Here, an E-CCE may refer to a basic control channel unit of the E-PDCCH composed of a plurality of REs (belonging to PRBs in the PDSCH region). The E-CCE may have a configuration depending on E-PDCCH transmission form. For example, an E-CCE for localized transmission can be configured using REs belonging to the same PRB pairs. On the other hand, an E-CCE for distributed transmission can be configured using REs extracted from a plurality of PRB pairs. In the case of localized E-CCE, an antenna port (AP)) may be independently used per E-CCE resource/index in order to perform optimized beamforming for each UE. In the case of distributed E-CCE, the same AP set may be repeatedly used for different E-CCEs such that a plurality of UEs can commonly use APs.

Like the L-PDCCH, the E-PDCCH carries DCI. For example, the E-PDCCH can carry downlink scheduling information and uplink scheduling information. An E-PDCCH/PDSCH transmission/reception process and an E-PDCCH/PUSCH transmission/reception process are identical/similar to steps S107 and S108 of FIG. 4. That is, the UE can receive an E-PDCCH and receive data/control information through a PDSCH corresponding to the E-PDCCH. In addition, the UE can receive an E-PDCCH and transmit data/control information through a PUSCH corresponding to the E-PDCCH. LTE adopts a method of reserving a PDCCH candidate region (referred to as a PDCCH search space hereinafter) within a control region and transmitting a PDCCH of a specific UE in a part of the reserved PDCCH candidate region. Accordingly, the UE can acquire the PDCCH thereof within the PDCCH search space through blind detection. Similarly, an E-PDCCH can be transmitted through a whole reserved resource or part of the reserved resource.

Figure 11:
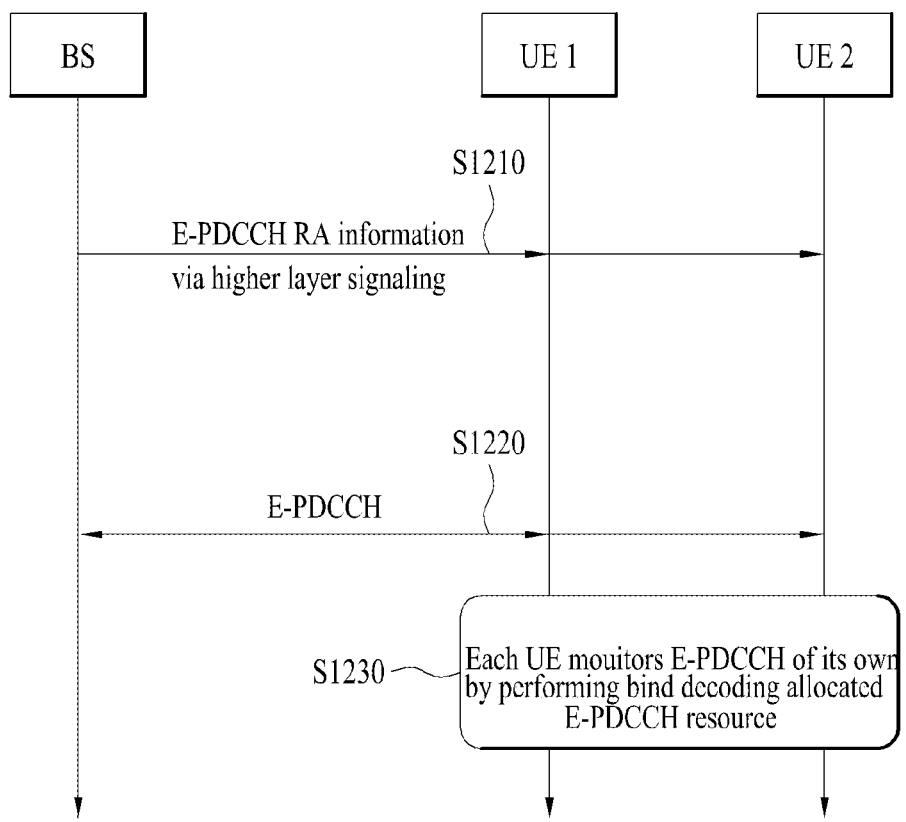
FIG. 11 illustrates a procedure of allocating resources for an E-PDCCH and receiving a PDSCH.

FIG. 11 illustrates a procedure of allocating a resource for an E-PDCCH and receiving the E-PDCCH.

Referring to FIG. 11, the BS transmits E-PDCCH resource allocation (RA) information to the UE (S1210). The E-PDCCH RA information can include RB (or VRB (virtual resource block)) allocation information. The RB allocation information can be provided on an RB basis or RBG (resource block group) basis. An RBG includes two or more contiguous RBs. The E-PDCCH RA information can be transmitted using higher layer (e.g. RRC) signaling. Here, the E-PDCCH RA information is used to reserve an E-PDCCH resource (region). The BS transmits an E-PDCCH to the UE (S1220). The E-PDCCH can be transmitted in part of the E-PDCCH resource (e.g. M RBs) reserved in step S1210 or in the entire E-PDCCH resource. Accordingly, the UE monitors a resource (region) (referred to as an E-PDCCH search space or simply search space) in which the E-PDCCH can be transmitted (S1230). The E-PDCCH search space can be provided as part of the RB set allocated in step S1210. Here, monitoring involves blind decoding of a plurality of E-PDCCH candidates in the search space.

In LTE Rel-8/9/10, a CRS is transmitted through all DL subframes (SFs) (other than DL subframes configured for specific purposes (e.g. MBSFN)) on carriers and control channels such as a PCFICH/PDCCH/PHICH are also transmitted (in some front OFDM symbols) through the DL subframes on carriers. Accordingly, backward compatibility for providing access/service of legacy UEs can be secured. In next-generation systems, a carrier of a new type, through which all or some of legacy signals/channels are not transmitted due to inter-cell interference improvement, carrier extendability enhancement, improved characteristics (e.g. 8Tx MIMO), etc., may be introduced. For convenience, the carrier of a new type is called a new type carrier (NCT). In contrast, a carrier type of 3GPP Rel-8/9/10 is called a legacy carrier type (LCT).

In reference signal transmission, the LCT can be used for fixed CRS transmission in some OFDM symbols at the front part of a subframe in all subframes over a total band. When the NCT is used, fixed CRS transmission with high density can be omitted or remarkably reduced. A CRS transmitted using the NCT may be an RS having the same configuration as the CRS transmitted using the LCT, an RS having a configuration similar to the CRS transmitted using the LCT or an RS newly defined for the NCT. In addition, when the NCT is employed, DL reception performance can be improved through DL data reception based on a UE-specific DM-RS and channel state measurement based on a (configurable) CSI-RS (Channel State Information RS) having a relatively low density and DL resources can be efficiently used by minimizing RS overhead. Accordingly, it is possible to consider DL data scheduling through the NCT by operating only DM-RS based TMs (e.g. TM 8, 9 and 10) from among conventional TMs (that is, setting a DL TM of a UE assigned the NCT).

Even in the case of NCT, synchronization, tracking and measurement may be required. To this end, a PSS/SSS having a configuration identical or similar to that in 3GPP Rel-8/9/10 can be transmitted. For example, relative order of SSs and SS transmission OFDM symbol positions can be changed for the NCT. In addition, a CRS may be transmitted only in some subframes and/or some frequency resources for synchronization, tracking, etc. Specifically, the CRS may be partially transmitted at specific time (e.g. in k (e.g. k=1) subframe periods at a specific interval) and a specific frequency. Furthermore, the CRS may be transmitted only through a specific antenna port in the case of NCT. When the CRS is transmitted for the purpose of synchronization, tracking, etc. with respect to the NCT, the CRS may not be used as an RS for demodulating a control channel and a DL signal.

Figure 12:
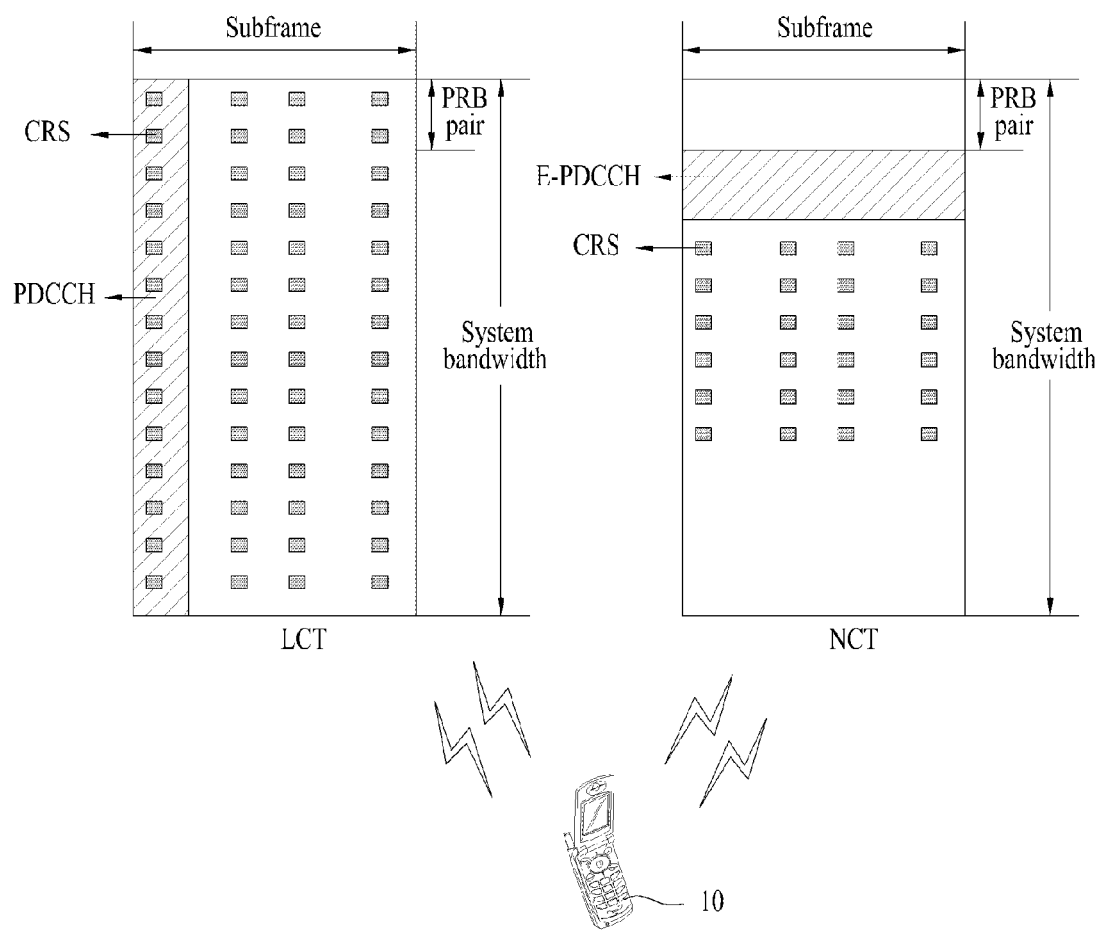
FIG. 12 illustrates a subframe configuration according to carrier type.

FIG. 12 illustrates subframe configurations of the LCT and NCT. Referring to FIG. 12, the LCT may use an L-PDCCH and the NCT may use an E-PDCCH based on a UE-specific RS (e.g. DM-RS). In the NCT, the E-PDCCH may be located from the first OFDM symbol of a subframe, distinguished from FIG. 10. At least part of a frequency band of the LCT and at least part of a frequency band of the NCT may overlap (case 1) or the frequency band of the LCT and the frequency band of the NCT may not overlap (case 2). Case 1 may be a case in which the LCT and NCT are operated by different eNBs and case 2 may be a case in which the LCT and NCT are operated by different eNBs or the same eNB.

Embodiment

In a TDD-based LTE(-A) system, a timing gap is necessary for DL SF=>UL SF conversion, as shown in FIG. 2(b). To this end, a special SF is included between a DL SF and a UL SF. The special SF can have various configurations according to situations such as radio conditions and UE positions.

Table 5 shows special SF configurations. In a special SF, DwPTS/GP/UpPTS may be configuration in various manners according to specific SF configuration (simply, S configuration) and CP combination.

TABLE 5

| Special subframe configuration | Normal CP in DL | | | Extended CP in DL | | |
| --- | --- | --- | --- | --- | --- | --- |
| | | UpPTS | | | UpPTS | |
| | DwPTS | Normal CP in UL | Extended CP in UL | DwPTS | Normal in UL | Extended CP in UL |
| 0 | 6592Ts (3 symbols) | 2192Ts | 2560Ts | 7680Ts (3 symbols) | 2192Ts | 2560Ts |
| 1 | 19760Ts (9 symbols) | | | 20480Ts (8 symbols) | | |
| 2 | 21952Ts (10 symbols) | | | 23040Ts (9 symbols) | | |
| 3 | 24144Ts (11 symbols) | | | 25600Ts (10 symbols) | | |
| 4 | 26336Ts (12 symbols) | | | 7680Ts (3 symbols) | 4384Ts | 5120Ts |
| 5 | 6592Ts (3 symbols) | 4384Ts | 5120Ts | 20480Ts (8 symbols) | | |
| 6 | 19760Ts (9 symbols) | | | 23040Ts (9 symbols) | | |
| 7 | 21952Ts (10 symbols) | | | — | — | — |
| 8 | 24144Ts (11 symbols) | | | — | — | — |

Numbers in parentheses indicate lengths of DwPTS periods, which are represented by the numbers of OFDM symbols. A DL SF, a UL SF and a special SF are respectively represented as D, U and S. Various special SF configurations (referred to as S configurations) are supported and DwPTS and UpPTS may depend on DL/UL CP configurations.

Figure 13:
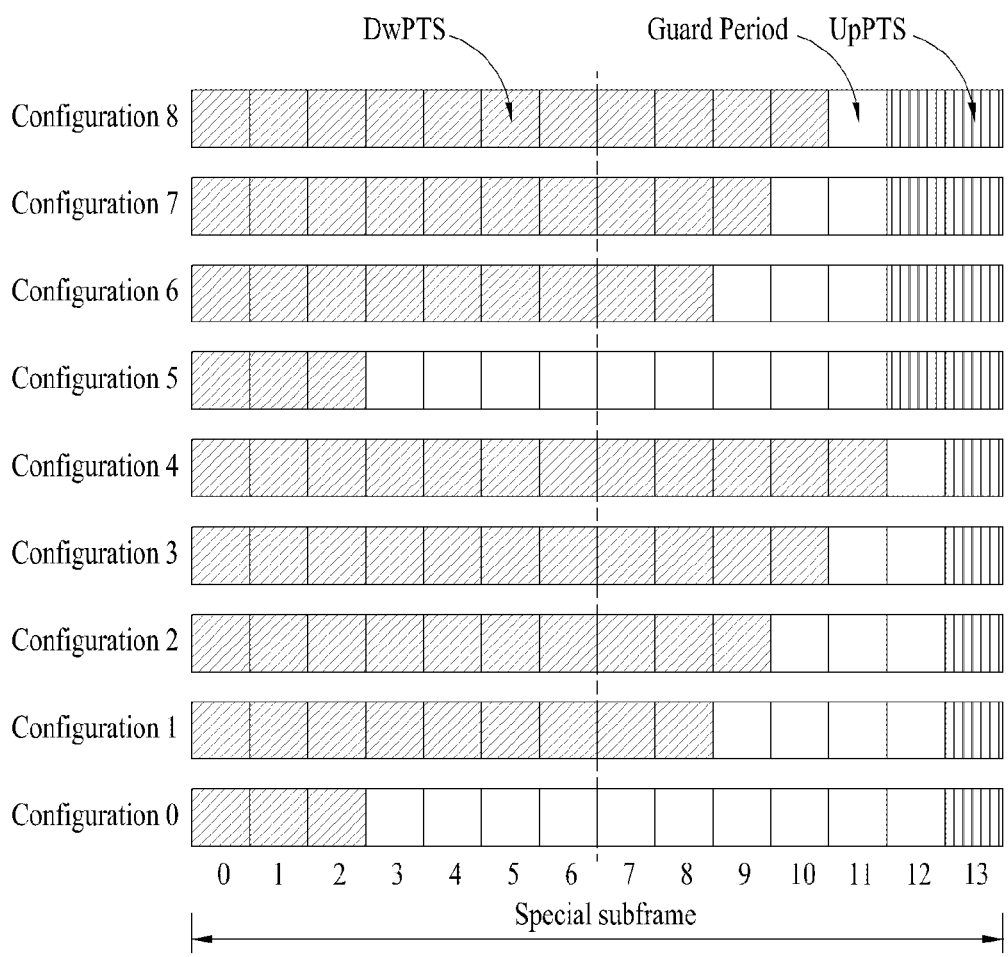
FIG. 13 illustrates special subframe configurations.

FIG. 13 shows the numbers of OFDM symbols of DwPTS, GP and UpPTS according to configurations of Table 5. When a normal CP is used (i.e. 14 OFDM symbols/subframes are used), the number of OFDM symbols that can be used for downlink transmission (i.e. DwPTS) depends on S configuration. Specifically, S configurations #0 and #5 can use first three OFDM symbols in the first slot as DwPTS. S configurations #1, #2, #3, #4, #6, #7 and #8 can use all OFDM symbols of the first slot as DwPTS.

Hereinafter, a specific SF in which DwPTS is composed of L (e.g. L=3) OFDM symbols is referred to as "shortest S (shS)". Referring to Table 5, S configurations #0 and #5 have shS in the case of DL normal CP and S configurations #0 and #4 have shS in the case of DL extended CP. Referring to FIG. 7, shS cannot be used to transmit a DM-RS due to short DwPTS. Accordingly, a DL signal (e.g. a control channel signal or a data channel signal) is demodulated based on a CRS in shS.

When the NCT is operated according to TDD (for at least DL), a CRS may be set such that CRS is not transmitted through DwPTS in shS or the CRS is not used to demodulate a DL signal (e.g. a control channel signal or a data channel signal) even when the CRS is transmitted. In this case, since L OFDM symbols in DwPTS of shS cannot be used to transmit DL data as well as (L-PDCCH based) control channels in the case of NCT, the NCT may waste DL resources compared to the legacy carrier that provides backward compatibility.

To solve this problem, a method of using NCT shS and a method of configuring NCT shS are provided. Detailed options can be arranged as follows. The following options can be combined in various manners except options 0 and 1 (e.g. options 2 and 3 are applied to DwPTS in shS of TDD NCT). In the following description, a PDCCH can include both the L-PDCCH and E-PDCCH unless otherwise mentioned. The following description focuses on UE operations in NCT shS and eNB operations may be performed corresponding to the UE operations. UE/eNB operations in the LCT and operations in a normal DL SF and a normal S SF in the NCT may be performed according to conventional schemes (refer to FIGS. 1 to 11). Accordingly, various UE/eNB operations can be performed for subframe types in the same carrier type according to carrier type.

Option 0: Special SF Configuration Except for shS

For the NCT, S configurations having shS (e.g. S configurations #0 and #5 in the case of DL normal CP case and S configurations #0 and #4 in the case of DL extended CP) may not be supported. Considering that the NCT is a secondary carrier additionally aggregated with a legacy carrier and an appropriate coverage can be deployed to improve resource/power utilization efficiency, this scheme can be usefully applied.

Option 1: No PDCCH and No DL Data in shS

Both PDCCH transmission and DL data (e.g. PDCCH) transmission may not be permitted in DwPTS in NCT shS. Accordingly, a UE may omit blind decoding for PDCCH detection and demodulation for DL data reception in NCT shS.

To make the best use of DL resources, operations (e.g. DL/UL grant transmission and the like) configured to be performed in DwPTS in shS may be performed in a carrier (e.g. PCell) other than the NCT. For example, the UE can monitor a PDCCH in the NCT at normal SF timing (i.e. D) and monitor a PDCCH in a PCell at shS timing (cross-CC scheduling). To this end, even when the NCT is not set to the cross-CC scheduling mode, cross-CC scheduling from a (predefined) different carrier can be exceptionally permitted for shS. This scheme can be restrictively applied to UL grants only since resources of U corresponding to shS are wasted when UL grant transmission is abandoned. Accordingly, in the non-cross-CC scheduling mode, the UE can monitor both DL/UL grant PDCCHs in the NCT at normal SF timing (i.e. D) and monitor only the UL grant PDCCH in the PCell at shS timing.

Option 2: E-PDCCH Based UL Grant in shS

Only UL grant E-PDCCH transmission can be permitted in DwPTS in NCT shS. This is because resources of U corresponding to shS are wasted when UL grant transmission is abandoned. Here, an additional DM-RS (having a configuration similar to a DM-RS for DL data reception) (e.g. enhanced DR-RS, E-DM-RS) may be transmitted in DwPTS for UL grant E-PDCCH detection. Accordingly, the UE can demodulate a control channel and a data channel in the NCT on the assumption that a CRS and/or a DM-RS are present in D (or normal S) according to a conventional mapping scheme and attempt to demodulate/detect an E-PDCCH in shS on the assumption that an additional DM-RS for UL grant E-PDCCH demodulation is present in DwPTS.

Option 3: Cross-CC Scheduled DL Data in shS

Only DL data transmission, which is cross-CC-scheduled by a DL grant PDCCH transmitted through a predetermined different carrier (e.g. PCell), can be permitted in DwPTS in NCT shS. To this end, cross-CC scheduling from a different carrier can be exceptionally permitted for shS even when the NCT is set to the non-cross-CC scheduling mode. For DL data reception, an additional DM-RS (e.g. E-DM-RS) can be transmitted in DwPTS of shS. Accordingly, the UE can demodulate a control channel and a data channel in the NCT on the assumption that a CRS and/or a DM-RS are present in D (or normal S) according to a conventional mapping scheme and attempt to demodulate/detect an E-PDCCH in shS on the assumption that an additional DM-RS for UL grant E-PDCCH demodulation is present in DwPTS.

Option 4: Cross-SF Scheduled DL Data in shS

Only DL data transmission, which is cross-CF-scheduled by a DL grant PDCCH transmitted through a DL SF (i.e. D) prior to shS, can be permitted in DwPTS in NCT shS. To this end, the following scheme can be considered. In the present scheme, shS can be normalized into a DL SF that is inappropriate to transmit a control channel signal. For example, shS can be normalized into a DL SF in which control channel signal transmission is restricted for interference cancellation, a DL SF in which control channel signal transmission is restricted in order to mitigate overhead due to control channel transmission or a DL SF (e.g. MBSFN SF) in which the number of OFDM symbols through which signals can be transmitted is limited for a specific reason. While only 2 SFs are exemplified to aid in understanding the present invention, the present scheme can be applied to three or more SFs. For example, a control channel signal for at least one of DL SFs #a, #b and #c can be transmitted in D SF #a.

DL grant/DL data for each D and S: Different pieces of DL data are transmitted in a D and an S and DL grant PDCCHs for the different pieces of DL data are individually transmitted through the D. The DL grant PDCCHs transmitted in D may include an indicator for identifying an SF (e.g. D or S) in which the DL data is transmitted. A DL grant PDCCH transmitted in a D other than the D may not include the indicator for identifying an SF (i.e. D or S) in which DL data is transmitted. When the DL grant PDCCH includes the indicator, the indicator may be fixed to a specific value for error check. To receive DL data transmitted in shS, a DM-RS (e.g. E-EM-RS) may be transmitted in DwPTS of shS.

One DL grant over D and S/DL data for each D and S: Different pieces of DL data are transmitted in a D and an S and one DL grant PDCCH is transmitted through the D for the two SFs. The DL grant PDCCH may include an indicator for identifying an SF (e.g. both D and S, only D or only S) in which DL data is transmitted. A DL grant PDCCH transmitted in a D other than the D may not include the indicator for identifying an SF (e.g. both D and S, only D or only S) in which DL data is transmitted. When the DL grant PDCCH includes the indicator, the indicator may be fixed to a specific value for error check. To receive DL data transmitted in shS, a DM-RS (e.g. E-EM-RS) may be transmitted in DwPTS of shS. When DL data is transmitted in both the D and S, a channel estimation result based on the DM-RS of the D may be used to receive DL data in shS. In this case, only DL data can be received in DwPTS in shS without DM-RS transmission. Accordingly, whether the DM-RS (e.g. E-DM-RS) can be transmitted in DwPTS in shS is determined according to the indicator and the UE can perform DL data demodulation in consideration of whether the DM-RS is transmitted in DwPTS in shS according to the determination result. Information on DM-RS REs are excluded from the data demodulation process when the DM-RS is transmitted in DwPTS in shS, whereas the information on the DM-RS REs may be used for the data demodulation process when the DM-RS is not transmitted in DwPTS in shS.

One DL grant/DL data over D and S: A single piece of DL data is transmitted through a D and an S and one DL grant PDCCH is transmitted through the D. The DL data may be transmitted through both the D and S all the time or selectively transmitted in at least one of the D and S (e.g. both the D and S, only D or only S). Here, a DM-RS (e.g. E-DM-RS) may be transmitted in DwPTS of shS. In the latter case, the DL grant PDCCH corresponding to the D may include an indicator for identifying a region in which DL data is transmitted. A DL grant PDCCH transmitted in a D other than the D may not include the indicator for identifying an SF (i.e. D or S) in which DL data is transmitted. When the DL grant PDCCH includes the indicator, the indicator may be fixed to a specific value for error check. When DL data is transmitted through both the D and S, a channel estimation result based on the DM-RS of the D may be used to receive a DL data part in shS. In this case, only DL data may be received in DwPTS of shS without DM-RS transmission. Accordingly, whether the DM-RS (e.g. E-DM-RS) can be transmitted in DwPTS of shS is determined according to the indicator and the UE can perform DL data demodulation in consideration of whether the DM-RS is transmitted in DwPTS of shS according to the determination result.

Option 5: E-PDCCH Based DL Grant and Corresponding DL Data in shS

Transmission of only a DL grant E-PDCCH and DL data corresponding to the DL grant E-PDCCH can be permitted in DwPTS in NCT shS. A DM-RS (e.g. E-DM-RS) can be transmitted in order to detect/receive the DL grant E-PDCCH and the DL data corresponding thereto.

When DL data is transmitted in DwPTS in shS, a method of determining a transport block size needs to be changed. In 3GPP Rel-8/9/10, the transport block size is determined using a table represented by combinations of the number of RBs and an MCS (Modulation and Coding Scheme). That is, when an eNB allocates the number of RBs and MCS for DL data reception, a transport block size (e.g. the number of bits) corresponding to [the number of RBs, MCS] is given according to a predetermined table. Since the transport block size is affected by the number of available OFDM symbols for DL data, a new table for the transport block size can be defined when DL data is transmitted using only a small number of OFDM symbols in shS. Specifically, when individual DL data (e.g. codeword) is transmitted only through DwPTS of shS, a transport block size table calculated on the assumption that 3 OFDM symbols are used can be used. If one piece of DL data (e.g. codeword) is transmitted through a normal DL SF and shS, then a transport block size table, which is calculated on the assumption that as many OFDM symbols as the sum of the numbers of OFDM symbols used in the normal DL SF and shS, can be used.

Another method of determining the transport block size is to refer to the conventional transport block size table defined for the normal DL SF in the legacy carrier. In this case, a value obtained by multiplying the number of RBs, $N'_{PRB}$, allocated through a DL grant by a weighting factor can be regarded as the number of RBs, $N_{PRB}$, defined in the conventional transport block size table. The weighting factor may be determined as a ratio of the number of available OFDM symbols in the method provided by the present invention (e.g. available OFDM symbols in a region corresponding to the sum of a normal DL SF and shS or only in shS) to the number of available OFDM symbols in the normal DL SF. For example, when individual DL data is transmitted only in DwPTS of shS, $N_{PRB}=\max\{$flooring $(N'_{PRB} \times \alpha), 1\}$ can be used ($0 < \alpha < 1$). If one piece of DL data is transmitted through a DL SF and shS, $N_{PRB}=\max\{$flooring $(N'_{PRB} \times \beta), 1\}$ can be used ($1 < \beta < 2$). Here, $\alpha=0.25$ and $\beta=1.25$. However, the present invention is not limited thereto.

As to a control channel resource unit (e.g. E-CCE) forming an E-PDCCH (candidate), 4 or 3 E-CCEs may be mapped per PRB (Physical Resource Block) in consideration of RS overhead in a normal DL SF. In view of this, one E-CCE may be mapped per PRB considering that only 3 OFDM symbols are available in DwPTS of shS in the case of option that permits E-PDCCH transmission.

Referring back to FIG. 7, in the case of DM-RS for a normal CP in 3GPP Rel-10, 8 antenna ports are divided into 2 CDM groups and RSs for 4 antenna ports constituting each CDM group are multiplexed to an RE group composed of 4 REs according to CDM using a length-4 spreading code (e.g. orthogonal code). The CDM groups are mapped to different RE groups and 4 REs constituting each RE group belong to different OFDM symbols. However, the DM-RS configuration of Rel-10 cannot be reused since only 3 OFDM symbols are available in DwPTS of shS. Accordingly, to transmit a DM-RS in shS, it is necessary to modify the conventional DM-RS configuration (FIG. 7) or define a new DM-RS configuration.

Figure 14:
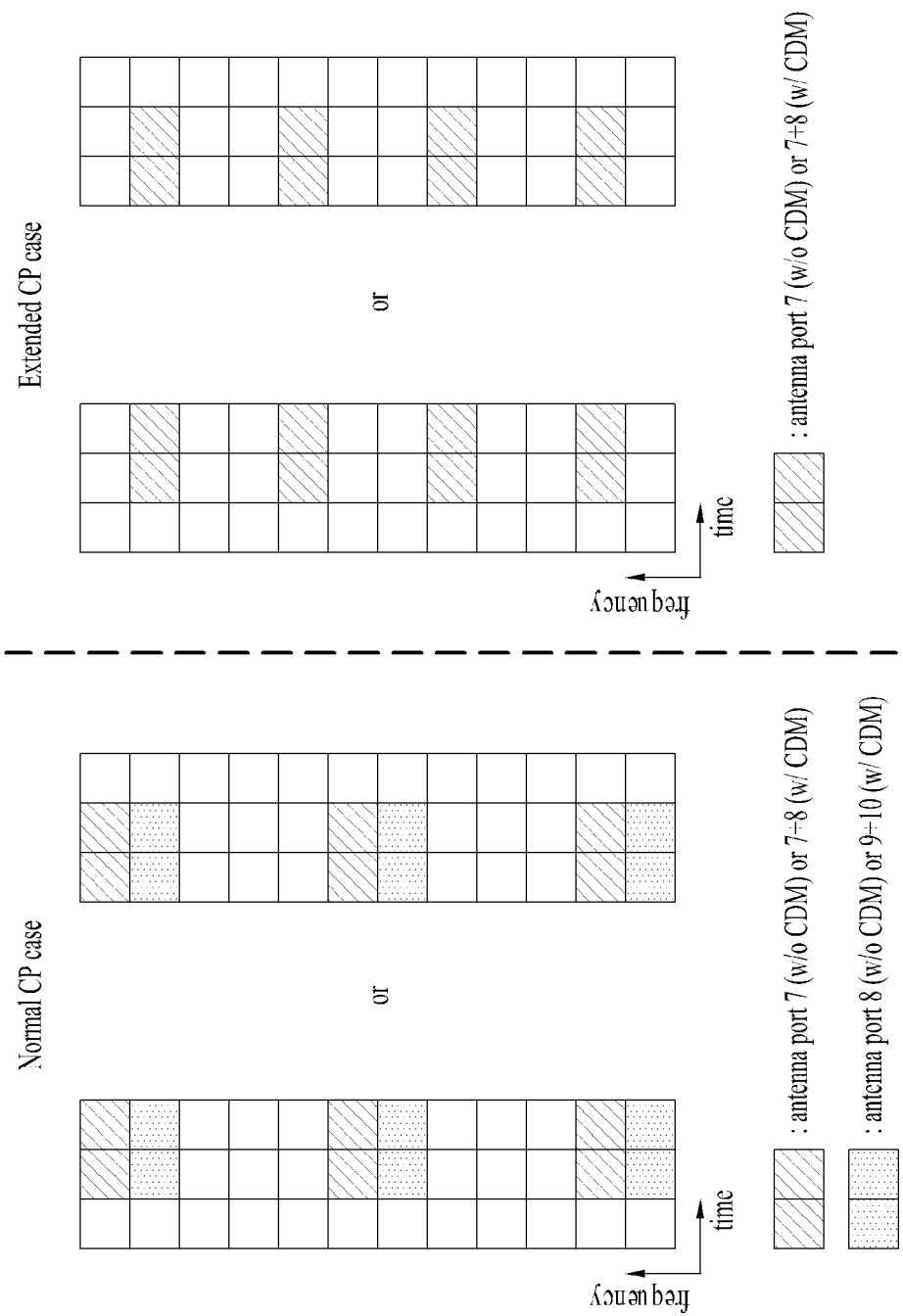
FIG. 14 illustrates DM-RS configurations according to an embodiment of the present invention.

FIG. 14 illustrates DM-RS configurations according to an embodiment of the present invention. It is assumed that DM-RS antenna ports {7, 8, 9, 10}, {7, 8} and {7} of 3GPP Rel-10 are used as 4 antenna ports, 2 antenna ports and one antenna port for DM-RSs for convenience. The example shown in FIG. 14 is applied to NCT shS only and, in a normal DL SF or a normal S SF, a DL signal can be demodulated using the configuration shown in FIG. 7.

Referring to FIG. 14, in the case option that permits DM-RS (e.g. E-DM-RS) transmission, 4 or 2 antenna ports may be respectively divided into 2 or 1 CDM group and RSs for 2 antenna ports constituting each CDM group may be multiplexed to an RE group composed of 2 REs according to CDM using a length-2 spreading code. In this case, the CDM groups may be mapped to different RE groups and 2 REs constituting each RE group may belong to different OFDM symbols. In addition, only two or one antenna port is used in NCT shS and an RS for a corresponding antenna port may be mapped to an RE group composed of two different REs without CDM. In this case, RSs for respective antenna ports may be mapped to different RE groups and 2 REs constituting each RE group may belong to different OFDM symbols. A sequence (i.e. [+1, +1] and [−1, +1]) used for CDM of DM-RS antenna ports {7, 8} in an extended CP in 3GPP Rel-10 can be used as a sequence used for application of length-2 CDM.

In addition, it is possible to map only one antenna port (e.g. antenna port 7 or 8) according to FDM/TDM or without FDM/TDM (and/or without CDM) by limiting a DL data (and/or E-PDCCH) transmission rank (or the number of transport layers) in NCT shS. For example, a single antenna port based DM-RS (e.g. E-DM-RS) can be transmitted using only REs corresponding to one antenna port (e.g. antenna port 7 or 9) (that is, using FDM), using all REs corresponding to all antenna ports (e.g. antenna ports 7, 8, 9 and 10) (that is, without using FDM/TDM) or using only an RE belonging to one OFDM symbol (that is, using TDM) in FIG. 14. In this case, a DCI format used to schedule DL data transmitted through NCT shS may be limited to a TM-common DCI format (e.g. DCI format 1A) since DL data is received using only one DM-RS antenna port. That is, scheduling based on TM-specific DCI format (e.g. DCI format 2C or 2D) transmission may not permitted for NCT shS. Accordingly, the UE can skip blind decoding for the TM-specific DCI format and perform blind decoding for the TM-common DCI format (e.g. DCI format 1A) for NCT shS.

On the assumption that only antenna port #0 is used in 3GPP Rel-10, a CRS and a PSS are respectively transmitted through the first and third OFDM symbols in DwPTS of shS. Here, when a CRS pattern for antenna port #0 of 3GPP Rel-10 is reused for NCT CRS transmission, a problem may be generated in application of the proposed options according to whether the CRS and/or PSS (and/or an SSS) are transmitted in DwPTS of NCT shS. To solve this problem, the following methods are proposed. It is assumed that the CRS, PSS and SSS are respectively transmitted through different OFDM symbols.

Case 1: No CRS, No PSS/SSS in shS

The CRS/PSS/SSS may not be transmitted in DwPTS of NCT shS. In this case, all the proposed options can be applied. A DM-RS (e.g. E-DM-RS) can be transmitted using REs of consecutive 2 OFDM symbols (e.g. first and second OFDM symbols or second and third OFDM symbols) (refer to 14).

Case 2: No CRS, PSS or SSS in shS

Only the PSS or SSS may be transmitted and the CRS may not be transmitted in DwPTS of NCT shS. In this case, all the proposed options can be applied. A DM-RS (e.g. E-DM-RS) can be transmitted using REs of 2 OFDM symbols (e.g. first and second OFDM symbols) other than the OFDM symbol (e.g. third OFDM symbol) through which the PSS/SSS is transmitted in NCT shS.

Case 3: No CRS, PSS and SSS in shS

Both the PSS and SSS may be transmitted and the CRS may not be transmitted in DwPTS of NCT shS. In this case, option 1 or 4 (schemes that do not involve DM-RS transmission) can be applied to RB regions in which the PSS and SSS are transmitted in NCT shS. Options and DM-RS (e.g. E-DM-RS) configurations available in case 1 can be applied to other RB regions in NCT shS.

Case 4: CRS, No PSS/SSS in shS

Only the CRS may be transmitted and the PSS and SSS may not be transmitted in DwPTS of NCT shS. In this case, all the proposed options can be applied. A DM-RS (e.g. E-DM-RS) may be transmitted using REs of 2 OFDM symbols (e.g. second and third OFDM symbols) other than the OFDM symbol (e.g. first OFDM symbol) through which the CRS is transmitted in NCT shS.

Case 5: CRS, PSS and/or SSS in Shortest S

The PSS and/or SSS as well as the CRS may be transmitted in DwPTS of NCT shS. In this case, option 1 or 4 (schemes that do not involve DM-RS transmission) may be applied to RB regions in which the PSS/SSS are transmitted in NCT shS. Options and DM-RS (e.g. E-DM-RS) configurations available in case 4 may be applied to RB regions other than the RB regions in which the PSS/SSS are transmitted in NCT shS.

A detailed description will be given of the E-CCE mapping method for E-PDCCH transmission. According to the E-CCE mapping method, one E-CCE may be set/allocated for one or two PRBs or any E-CCE may not be set/allocated to a specific PRB on the basis of the number of REs occupied by RSs (e.g. E-DM-RS) and/or SSs (PSS and/or SSS) in DwPTS of shS. For example, an E-CCE is not allocated to a PRB in a region in which an SS is transmitted in NCT shS and one E-CCE is allocated for one or two PRBs in a region in which an SS is not transmitted in NCT shS. Otherwise, one E-CCE is allocated for two PRBs in a region in which an SS is transmitted in NCT shS and one E-CCE is allocated per PRB in a region in which an SS is not transmitted in NCT shS. Alternatively, one E-CCE may be allocated per PRB in a region in which RSs for a plurality of antenna ports are transmitted according to FDM/TDM (and/or without CDM) (without SS transmission) in NCT shS, whereas one E-CCE may be allocated for two PRBs in a region in which RSs for single or multiple antenna ports are transmitted without FDM/TDM (and/or without CDM) (without SS transmission) in NCT shS (e.g. a region in which RSs are transmitted using all REs corresponding to all antenna ports 7, 8, 9 and 10 in FIG. 14). Alternatively, one E-CCE may be set/allocated per PRB irrespective RS and SS overhead in DwPTS of NCT shS and blind decoding for E-PDCCH detection may be performed only for E-CCE aggregation level 2 or higher. Alternatively, one E-CCE may be set/allocated for two PRBs irrespective RS and SS overhead in NCT shS and blind decoding for E-PDCCH detection may be performed for all E-CCE aggregation levels (including E-CCE aggregation level 1). Furthermore, it is possible to independently set/allocate a search space for E-PDCCH detection in NCT shS and the number of blind decoding operations per E-CCE aggregation level, separately from a search space (i.e. E-PDCCH PRB set) for E-PDCCH detection in a normal DL SF.

Application of the proposed methods (options 1 to 5 according to cases 1 to 5 and combinations thereof, and proposed DM-RS/E-DM-RS configurations) is not limited to NCT in which shS is configured and the proposed methods can be applied to a case in which an arbitrary special SF or a special SF in which DwPTS is composed of less than N OFDM symbols is configured in NCT. In addition, which one of the proposed methods is applied may be set cell-specifically or UE-specifically. N may be 7 (normal CP) or 6 (extended CP) identical to the number of OFDM symbols in one slot in a normal DL SF.

Even NCT may be severely interfered by various control channels/RS signals transmitted through an L-PDCCH region on legacy carriers. To prevent interference, an E-PDCCH start symbol position (e.g. E-PDCCH_startSym) and/or a DL data start symbol position (e.g. DL-data_startSym) for NCT may be set. If an OFDM symbol index starts from 0 in an SF, then E-PDCCH_startSym and DL-data_startSym may have values in the range of 0 to 3 (or 0 to 4). In this case, the proposed methods can be adaptively applied to an arbitrary special SF or a special SF in which DwPTS is composed of less than N OFDM symbols, which is configured in NCT, in consideration of the E-PDCCH_startSym and DL-data_startSym values.

Specifically, different methods may be applied to a case in which E-PDCCH_startSym and DL-data_startSym have values greater than K and a case in which E-PDCCH_startSym and DL-data_startSym have values less than K. K may be 2 (or 3). Specifically, option 1 (or schemes that do not involve DM-RS transmission in option 4) may be applied when the E-PDCCH_startSym and DL-data_startSym values are greater than K, whereas all options may be applied when the E-PDCCH_startSym and DL-data_startSym values are less than K. Regarding the size of an RE group to which/in which a DM-RS (e.g. E-DM-RS) is mapped/transmitted, option 1 or a 2-RE configuration based DM-RS transmission scheme (similar to FIG. 14) may be applied when the E-PDCCH_startSym and DL-data_startSym values are greater than K. That is, the DM-RS can be mapped to an RE group composed of 2 REs belonging to different OFDM symbols. When the E-PDCCH_startSym and DL-data_startSym values are less than K, a 4-RE configuration based DM-RS transmission scheme similar to that in 3GPP Rel-10 may be applied. That is, the DM-RS can be mapped to an RE group composed of 4 REs belonging to different OFDM symbols.

When shS is configured in NCT and E-PDCCH_startSym and/or DL-data startSym have values greater than 2, the number of available OFDM symbols may be limited to 1 or less. Here, the number of available OFDM symbols may be calculated only on the basis of OFDM symbols (e.g. OFDM symbols through which PSS/SSS/CRS are not transmitted) through which a DM-RS (e.g. E-DM-RS) can be transmitted. In this case, options (e.g. options 2, 3 and 5 and schemes that do not involve DM-RS transmission in option 4) that permit E-PDCCH and/or DL data transmission in shS from among the proposed options may be excluded and option 1 (or schemes that do not involve DM-RS transmission in option 4) may be applied. When the E-PDCCH_startSym and/or DL-data startSym values are less than 2 under the same conditions, all the proposed options can be applied since two or more available OFDM symbols are secured.

Alternatively, when a special SF in which DwPTS is composed of 6 OFDM symbols is configured in TDD NCT and the E-PDCCH_startSym and/or DL-data_startSym values are greater than 3, option 1 or a 2-RE configuration based DM-RS (e.g. E-DM-RS) transmission scheme (similar to FIG. 14) may be applied since the number of available OFDM symbols is limited to three or less. When the E-PDCCH_startSym and/or DL-data_startSym values are less than 3 under the same conditions, the conventional 4-RE configuration based DM-RS transmission scheme may be applied since four or more available OFDM symbols are secured.

Alternatively, it is possible to consider Alt 1) a method of omitting all of some UpPTSs in shS and extending DwPTSs corresponding to the omitted UpPTSs or Alt 2) a method of omitting all or some DwPTSs in shS and extending UpPTSs corresponding to the omitted DwPTSs, for TDD NCT. In the case of Alt 1, options 1 to 5 and the proposed DM-RS (e.g. E-DM-RS) configuration (e.g. FIG. 14) may be applied or modified and applied to the extended DwPTS interval according to cases 1 to 5. In the case of Alt 2, additional UL signal and data (e.g. SRS/PRACH and/or short PUSCH and the like) transmission may be set/permitted for the extended UpPTS interval. When the aforementioned schemes are normalized, the proposed methods can be similarly applied to an arbitrary special SF (including shS) or a special SF in which DwPTS is composed of less than N OFDM symbols in the case of NCT. That is, in the case of NCT, it is possible to consider a method of omitting all or some UpPTSs in a special SF and extending a DwPTS interval corresponding to the omitted UpPTS interval or omitting all or some DwPTSs in a special SF and extending a UpPTS interval corresponding to the omitted DwPTS interval.

The proposed methods are not limited to the special SF. For example, the proposed methods can be similarly applied to a case in which an SF is configured in a form (e.g. DwPTS+Tx/Rx switching gap+UpPTS) similar to the special SF, irrespective of FDD/TDD and/or carrier type. For example, a PCell and an (NCT based) SCell may be SFs respectively configured as a special SF and a DL SF in case of CA of different TDD UL-DL configurations. Here, when simultaneous transmission and reception are not supported/permitted (that is, half-duplex), the DL SF of the SCell can be regarded as shS (DwPTS of the corresponding S) and the proposed methods can be applied in an identical/similar manner. In addition, the proposed methods may be similarly applied to a case in which DL intervals other than an interval configured for a special purpose (e.g. MBSFN) is set to a relatively short period in an SF. For example, the proposed methods can be applied to a DL interval (e.g. first m OFDM symbols (e.g. m=2) in a corresponding SF) other than an interval in which an MBSFN signal (e.g. MBSFN data, MBSFN-RS) is transmitted (or an interval configured to transmit the MBSFN signal) in an SF configured as an MBSFN. Particularly, operations of options 1 and 2, the method of case 1 and operations according to E-PDCCH related E-DM-RS transmission/E-CCE mapping and E-PDCCH_startSym can be applied. Furthermore, MBSFN data may be regarded as "DL data in shS" and thus the proposed methods (e.g. operation of option 3, 4 or 5) may be applied. For example, the MBSFN data can be cross-CC-scheduled by a carrier other than a carrier in which an MBSFN SF is configured or cross-SF-scheduled by an SF (immediately) prior to an MBSFN SF.

Figure 15:
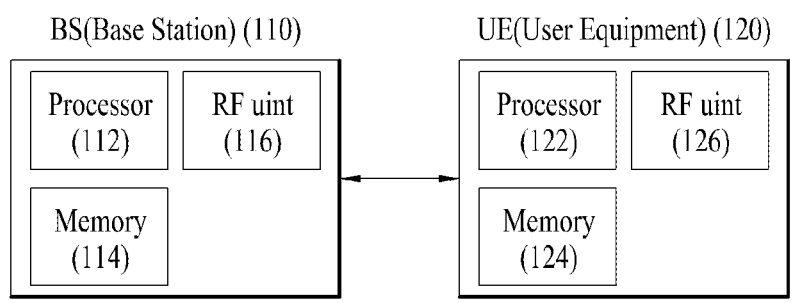
FIG. 15 is a block diagram of a BS and a UE according to an embodiment of the present invention.

FIG. 15 illustrates a BS and a UE applicable to embodiments of the present invention.

Referring to FIG. 15, a wireless communication system includes a BS 110 and a UE 120. On downlink, a transmitter is part of the BS 110 and a receiver is part of the UE 120. On uplink, the transmitter is part of the UE 120 and the receiver is part of the BS 110. The BS 110 includes a processor 112, a memory 114 and an RF unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124, and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal. The BS 110 and the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by subsequent amendment after the application is filed.

In the embodiments of the present invention, a description has been given centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'in' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a method and apparatus for performing communication when a plurality of carrier types is supported in a wireless mobile communication system.

The invention claimed is:

1. A method for receiving a downlink signal by a user equipment (UE) supporting a plurality of carrier types in a wireless communication system, the method comprising:
receiving, by the UE, a first downlink signal through a downlink pilot time slot (DwPTS) in a special subframe including the DwPTS, a guard period (GP), and an uplink pilot time slot (UpPTS), wherein a length of the DwPTS is less than or equal to half the special subframe; and
demodulating, by the UE, the first downlink signal,
wherein the first downlink signal is demodulated using a first cell-common reference signal when the first downlink signal is received on a first type carrier,
wherein the first downlink signal is demodulated using a UE-specific reference signal when the first downlink signal is received on a second type carrier, and
wherein the first downlink signal is scheduled by a first physical downlink control channel (PDCCH) signal transmitted through a downlink subframe prior to the special subframe on the second type carrier, when the first downlink signal is received on the second type carrier.

2. The method according to claim 1, wherein the first type carrier is a carrier through which the first cell-common reference signal is received in all subframes and the second type carrier is a carrier through which a second cell-common reference signal is received only in some subframes.

3. The method according to claim 1, wherein the special subframe includes 14 orthogonal frequency division multiplexing (OFDM) symbols and the length of the DwPTS corresponds to 3 OFDM symbols if a normal cyclic prefix (CP) is set.

4. The method according to claim 1, wherein the special subframe includes 12 orthogonal frequency division multiplexing (OFDM) symbols and the length of the DwPTS corresponds to 3 OFDM symbols if an extended cyclic prefix (CP) is set.

5. The method according to claim 1, wherein the first downlink signal includes an uplink grant control channel signal for scheduling an uplink data channel signal.

6. The method according to claim 1, further comprising:
receiving, by the UE, a second downlink signal through the downlink subframe prior to the special subframe on the second type carrier,
wherein the second downlink signal is scheduled by a second PDCCH signal transmitted through the downlink subframe prior to the special subframe on the second type carrier.

7. A user equipment (UE) used in a wireless communication system, the UE comprising:
a radio frequency (RF) unit; and
a processor configured to control the RF unit to:
receive a first downlink signal and a first cell common reference signal through a downlink pilot time slot (DwPTS) in a special subframe including the DwPTS, a guard period (GP), and an uplink pilot time slot (UpPTS), wherein a length of the DwPTS is less than or equal to half the special subframe, and
demodulate the first downlink signal,
wherein the first downlink signal is demodulated using a first cell-common reference signal when the first downlink signal is received on a first type carrier,
wherein the first downlink signal is demodulated using a UE-specific reference signal when the first downlink signal is received on a second type carrier, and
wherein the first downlink signal is scheduled by a first physical downlink control channel (PDCCH) signal transmitted through a downlink subframe prior to the special subframe on the second type carrier, when the first downlink signal is received on the second type carrier.

8. The UE according to claim 7, wherein the first type carrier is a carrier through which the first cell-common reference signal is received in all subframes and the second type carrier is a carrier through which a second cell-common reference signal is received only in some subframes.

9. The UE according to claim 7, wherein the special subframe includes 14 orthogonal frequency division multiplexing (OFDM) symbols and the length of the DwPTS corresponds to 3 OFDM symbols when a normal cyclic prefix (CP) is set.

10. The UE according to claim 7, wherein the special subframe includes 12 orthogonal frequency division multiplexing (OFDM) symbols and the length of the DwPTS corresponds to 3 OFDM symbols when an extended cyclic prefix (CP) his set.

11. The UE according to claim 7, wherein the first downlink signal includes an uplink grant control channel signal for scheduling an uplink data channel signal.

12. The UE according to claim 7, wherein the processor further controls the RF unit to receive a second downlink signal through the downlink subframe prior to the special subframe on the second type carrier, and
wherein the second downlink signal is scheduled by a second PDCCH signal transmitted through the downlink subframe prior to the special subframe on the second type carrier.

* * * * *